(12) United States Patent
Togo et al.

(10) Patent No.: US 9,515,848 B2
(45) Date of Patent: Dec. 6, 2016

(54) TRANSMISSION DEVICE, TRANSMISSION SYSTEM, AND TRANSMISSION METHOD

(71) Applicant: FUJITSU LIMITED, Kawasaki-shi, Kanagawa (JP)

(72) Inventors: Toshihiro Togo, Kawasaki (JP); Kanji Naito, Kawasaki (JP); Koji Takeguchi, Kawasaki (JP); Mineshi Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 14/501,170

(22) Filed: Sep. 30, 2014

(65) Prior Publication Data

US 2015/0098702 A1   Apr. 9, 2015

(30) Foreign Application Priority Data

Oct. 3, 2013 (JP) ................................ 2013-208451

(51) Int. Cl.
*H04L 12/18* (2006.01)
*H04L 12/64* (2006.01)

(52) U.S. Cl.
CPC ................ *H04L 12/6418* (2013.01)

(58) Field of Classification Search
CPC .. H04B 10/2575; H04B 10/27; H04B 10/50; H04L 12/18; H04W 24/04
USPC ................... 370/252, 329, 235, 406
See application file for complete search history.

(56) References Cited

U.S. PATENT DOCUMENTS

| 5,987,027 | A | 11/1999 | Park et al. | |
|---|---|---|---|---|
| 7,676,231 | B2* | 3/2010 | Demirhan | H04W 72/02 370/329 |
| 2005/0141539 | A1 | 6/2005 | Hamilton et al. | |
| 2005/0175008 | A1* | 8/2005 | Thompson | H04L 12/18 370/390 |

FOREIGN PATENT DOCUMENTS

| JP | 10-294729 | 11/1998 |
|---|---|---|
| JP | 2005-192213 | 7/2005 |

* cited by examiner

*Primary Examiner* — Jamal Javaid
(74) *Attorney, Agent, or Firm* — Staas & Halsey LLP

(57) ABSTRACT

A transmission device that is coupled to a mesh network includes a memory, and a processor coupled to the memory, configured to detect an another transmission device in the mesh network, which receives a first data signal that is same as a second data signal requested to the transmission device, and branch the first data signal to the transmission device from the detected another transmission device.

14 Claims, 22 Drawing Sheets

FIG. 4

| Byte Row | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | FAS OH | | | | | | | OTU OH | | | | | | | OPU OH | |
| 2 | RES | PM& TCM | TCM ACT | TCM6 | | TCM5 | | TCM4 | | FTFL | | |
| 3 | TCM3 | | TCM2 | | TCM1 | | PM | | EXP | | | |
| 4 | GCC1 | | GCC2 | | APS/PCC | | RES | | | | | |

FIG. 6

| ROUTE | SIGNAL IDENTIFICATION INFORMATION |
|---|---|
| #1 | Music_Channel_1 |
| #2 | Video_Channel_1 |
| #3 | Music_Channel_2 |
| #3 | Video_Channel_2 |

FIG. 7

| ROUTE | USED BANDWIDTH | UNUSED BANDWIDTH |
|---|---|---|
| #1 | ODU0 × 3 | ODU0 × 5 |
| #2 | ODU1 × 2 | ODU1 × 2 |
| #3 | ODU0 × 1 | ODU0 × 7 |
| #4 | ODU1 × 1 | N/A |

FIG. 16

| NODE | SIGNAL IDENTIFICATION INFORMATION | PRIORITY LEVEL | REQUEST TARGET NODE | ROUTE |
|---|---|---|---|---|
| 3-2 | Video_Channel_1 | 1 | 3-1 | #1 |
|  | Video_Channel_1 | 2 | 3-3 | #3 |
| 3-1 | Video_Channel_1 | 1 | 3-2 | #3 |
|  | Video_Channel_1 | 2 | 3-3 | #3 |
| 3-3 | Video_Channel_1 | 1 | 3-1 | #1 |
|  | Video_Channel_1 | 2 | 3-2 | #1 |

TRANSMISSION DEVICE, TRANSMISSION SYSTEM, AND TRANSMISSION METHOD

CROSS-REFERENCE TO RELATED APPLICATION

This application is based upon and claims the benefit of priority from the prior Japanese Patent Application No. 2013-208451 filed on Oct. 3, 2013, the entire contents of which are incorporated herein by reference.

FIELD

The embodiments discussed herein are related to a transmission device, a transmission system, and a transmission method.

BACKGROUND

With an increase in demand for communication, a high-speed optical transmission scheme has been standardized. For example, the International Telecommunication Union Telecommunication Standardization Sector (ITU-T) recommendation G.709 defines a scheme of an Optical Transport Network (OTN) operating at about 1.25 to 100 Gbps.

Optical transmission in the OTN is performed such that a plurality of client signals is accommodated in an optical signal in a format called an Optical channel Transport Unit (OTU) frame, so that transmission of data having large capacity may be performed. As the client signal that is accommodated in the OTU frame, there are a Synchronous Digital Hierarchy (SDH) frame, a Synchronous Optical NETwork (SONET) frame, and an Ethernet (registered trademark) frame.

The client signals are respectively accommodated for Optical Data Units (ODU) that are multiplexed in the OTU frame. The bandwidth type of the ODU is defined by "ODUk" (k=0, 1, . . . ). For example, an ODU0 is a unit of data of 1.25 Gbps, and an ODU1 is a unit of data of 2.5 Gbps, and an ODU2 is a unit of data of 10 Gbps.

The OTN technology achieves transmission of data having large capacity in the unit of the ODU, so that contents such as a video and music may be provided to a user with high quality and multi-channel when the OTN technology is applied to a broadcast distribution system.

Regarding the broadcast distribution technology, for example, Japanese Laid-open Patent Publication No. 10-294729 discloses a connection procedure that is used to find by rearrangement a path for multirate/multicast traffic through an SDH cross-connect with sub-network connection protection. In addition, Japanese Laid-open Patent Publication No. 2005-192213 discloses a network-based data distribution scheme in which data to be distributed to a plurality of destination links is replicated in a physical layer in a network-based communication system.

SUMMARY

According to an aspect of the invention, A transmission device that is coupled to a mesh network includes a memory, and a processor coupled to the memory, configured to detect an another transmission device in the mesh network, which receives a first data signal that is same as a second data signal requested to the transmission device, and branch the first data signal to the transmission device from the detected another transmission device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a structure of an overhead;

FIG. 6 is a table illustrating an example of a content of a first identification information storage unit;

FIG. 7 is a table illustrating an example of a content of a bandwidth information storage unit;

FIG. 16 is a table illustrating an example of a content of a management table;

DESCRIPTION OF EMBODIMENTS

When a failure occurs in a transmission path in a network, the transmission path is switched from the work side path to the protection side path by an Automatic Protection Switching (APS) function. As a scheme that achieves the APS function, for example, there are 1+1 protection, a Unidirectional Path Switched Ring (UPSR), an Optical-UPSR (O-UPSR), and a Bi-directional Line Switched Ring (BLSR).

In the broadcast distribution system, transmission of real-time data such as a video and music is performed, so that it is desirable that the transmission path is switched rapidly. When the APS function is achieved by the above-described scheme, it is desirable that a bandwidth of the protection side path is obtained beforehand along the transmission path from a distribution server to a reception device on the user side. This is applied to a case of a mesh network in addition to a ring network.

A connection between nodes of the mesh network is complicated as compared with the ring network. Therefore, in the case of the mesh network, setting processing of the transmission path is complicated, so that it is difficult to switch a transmission path rapidly. In addition, in a case of a network that is layer 2 or above such as the Ethernet, the transmission of data is dynamically switched by packet forwarding processing based on destination information that is included in a frame, so that the setting processing of the transmission path is not executed.

However, as the above-described OTN, in a case of a network of a layer 1, the setting processing of a transmission path is executed, so that it is desirable that the setting processing is completed rapidly. In addition to the case of switching of the transmission path, the rapid setting processing is desired in a case in which a transmission path from the distribution server to the reception device on the user side is newly set.

The embodiments discussed herein are made in view of the above-described problems, and a transmission device, a transmission system, and a transmission method are provided in which a transmission path of broadcast distribution may be set rapidly.

Figure 1:
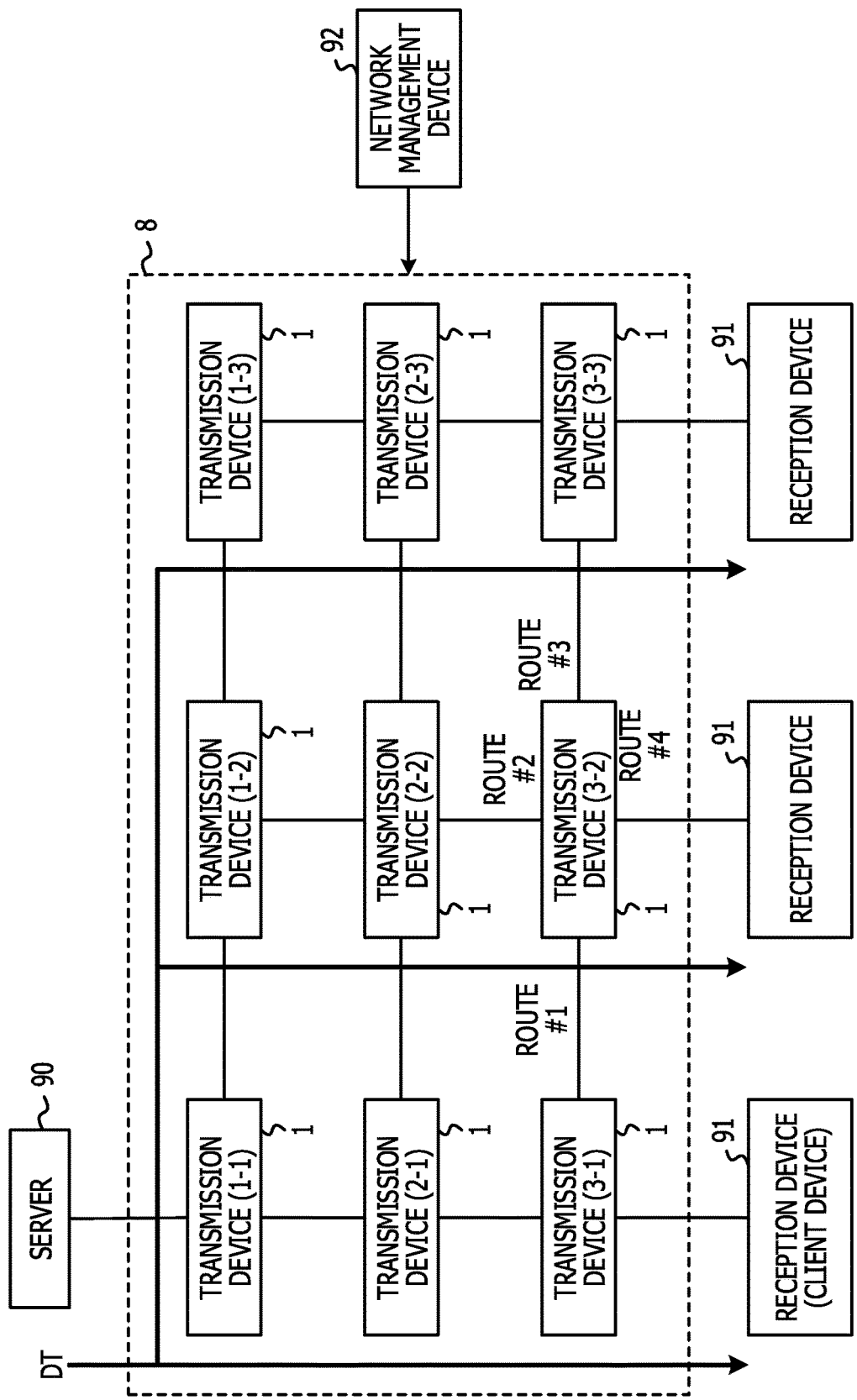
FIG. 1 is a diagram illustrating a structure of a transmission system according to an embodiment.

FIG. 1 is a diagram illustrating a structure of a transmission system according to an embodiment. The transmission system includes a server 90, a network management system 92, a plurality of receive devices (client devices) 91, and a mesh network 8. The network 8 includes a plurality of transmission devices 1 that are interconnected to each other, and through which a data signal DT that has been input from the server 90 is transmitted to the plurality of reception devices 91.

The server 90, the plurality of transmission devices 1, and the plurality of reception devices 91 are interconnected to each other through optical fibers. Each of the transmission devices 1 is connected to a network management system 92 that manages the network 8. In FIG. 1, "(1-1)" to "(3-3)" indicate node numbers in the network.

The server 90 distributes, for example, a data signal DT such as a video and music, to the plurality of reception devices 91, through the network 8. That is, the data signal DT is a broadcast signal to be transmitted to the plurality of reception devices 91. The broadcast signal may be transmitted to all of the reception devices 9 that are connected to the server 90, or may be transmitted to some of the reception devices 91 through the network 8. In FIG. 1, to the network 8, merely one data signal DT is transmitted, but data signals having a plurality of types may be respectively transmitted though different transmission paths.

In the example, it is assumed that transmission paths of a data signal DT, which is from the server 90 to the reception devices 91, are paths passing through the following nodes of (1) to (3).

(1): nodes (1-1), (2-1), and (3-1)
(2): nodes (1-1), (1-2), (2-2), and (3-2)
(3): nodes (1-1), (1-2), (1-3), (2-3), and (3-3)

The network management system 92 sets each of the above-described transmission paths and a bandwidth of the data signal DT, to each of the transmission devices 1.

The reception device 91 is, for example, a set-top box that is installed at a user's house of delivery service of a video, music, and the like. The reception device 91 receives a data signal DT that is broadcasted and delivered from the server 90.

The transmission device 1 is connected to the network 8, and for example, based on the OTN technology that is defined by the ITU-T recommendation G.709, a data signal DT is mapped onto an OTU frame and transmitted. In addition, the transmission device 1 is not limited to such a case, and a data signal DT may be transmitted by a further scheme.

As described below, the transmission devices 1 of adjacent nodes (3-1) to (3-3) of each of the reception devices 91 reset autonomously transmission paths of a data signal DT when the data signal DT is not allowed to be received due to occurrence of a failure. In addition, the above-described transmission device 1 autonomously sets the transmission path of the data signal DT in response to a transmission instruction of the data signal DT from the reception device 91 when the reception device 91 is added to the transmission system. That is, the above-described transmission device 1 sets a transmission path of a data signal DT that has been requested to the transmission device 1.

Due to the setting of the transmission path, the transmission device 1 detects a further transmission device 1 that has received a data signal DT that is identical to the data signal DT that has been requested to the transmission device 1, and transmits the data signal DT to branch to the transmission device 1 from the detected transmission device 1. In addition, the transmission device 1 transmits the branched data signal DT to the reception device 91. As a result, the transmission device 1 may transmit the data signal DT from the detected further transmission device 1 to the reception device 91 while saving the effort of setting of the transmission path that ranges from the server 90 that is the transmission source of the data signal DT to the reception device 91.

There is no difference between the configurations of the transmission devices 1, but in the following description, for convenience of description, the transmission device 1 to which a data signal DT has requested is referred to as "request side transmission device", and a further transmission device 1 is referred to as "non-request side transmission device". In addition, in the following description, a transmission path in the transmission system is referred to as "route". For example, the transmission device 1 of the node (3-2) illustrated in FIG. 1 is connected to the routes #1 to #4, and from among the routes, the route #4 is a transmission path with the reception device 91. In addition, in the following description, a transmission direction or reception direction of each signal is indicated by a route.

First Embodiment

Figure 2:
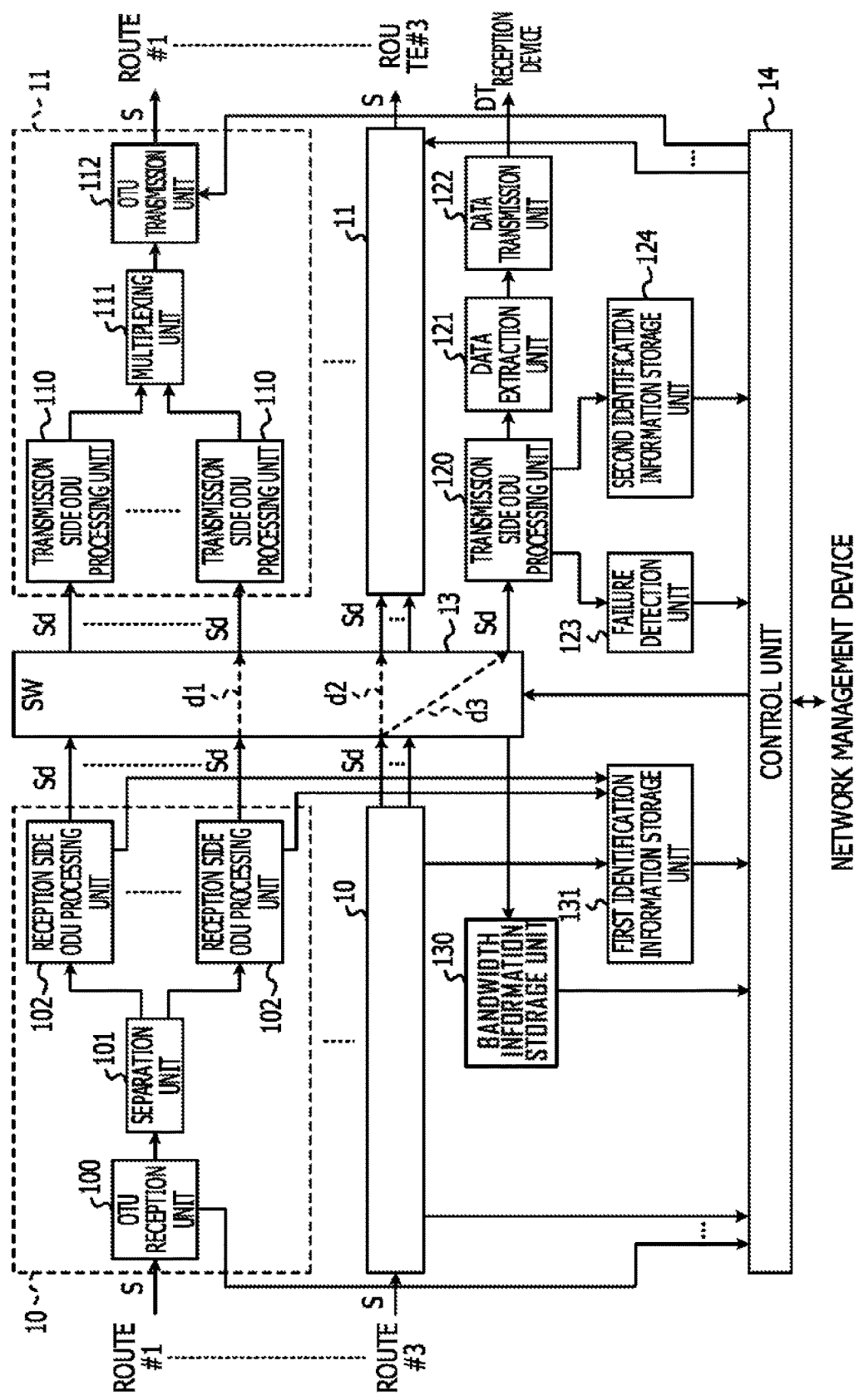
FIG. 2 is a diagram illustrating a structure of a transmission device according to a first embodiment.

FIG. 2 is a diagram illustrating a structure of the transmission device 1 according to a first embodiment. The transmission device 1 includes a plurality of reception processing units 10, a plurality of the transmission processing units 11, a switch unit 13, and a control unit 14. The transmission device 1 further includes a bandwidth information storage unit 130, a first identification information storage unit 131, a transmission side (client side) ODU processing unit 120, a data extraction unit 121, a data transmission unit 122, a failure detection unit 123, and a second identification information storage unit 124.

The reception processing unit 10 and the transmission processing unit 11 are provided for each of the routes. In the case of the transmission device 1 of the node (3-2) illustrated in FIG. 1, as illustrated in FIG. 2, the reception processing unit 10 and the transmission processing unit 11 that correspond to each of the routes #1 to #3 are provided. In addition, for the route #4 on the reception device 91 side, the transmission side (client side) ODU processing unit 120, the data extraction unit 121, and the data transmission unit 122 are provided.

The reception processing unit 10 includes an OTU reception unit 100, a separation unit 101, and a plurality of reception side ODU processing units 102, and executes reception processing of an OTU signal S that has been received from the corresponding route. The OTU signal S is formed, for example, by an OTU frame that is defined by the ITU-T recommendation G.709.

Figure 3:
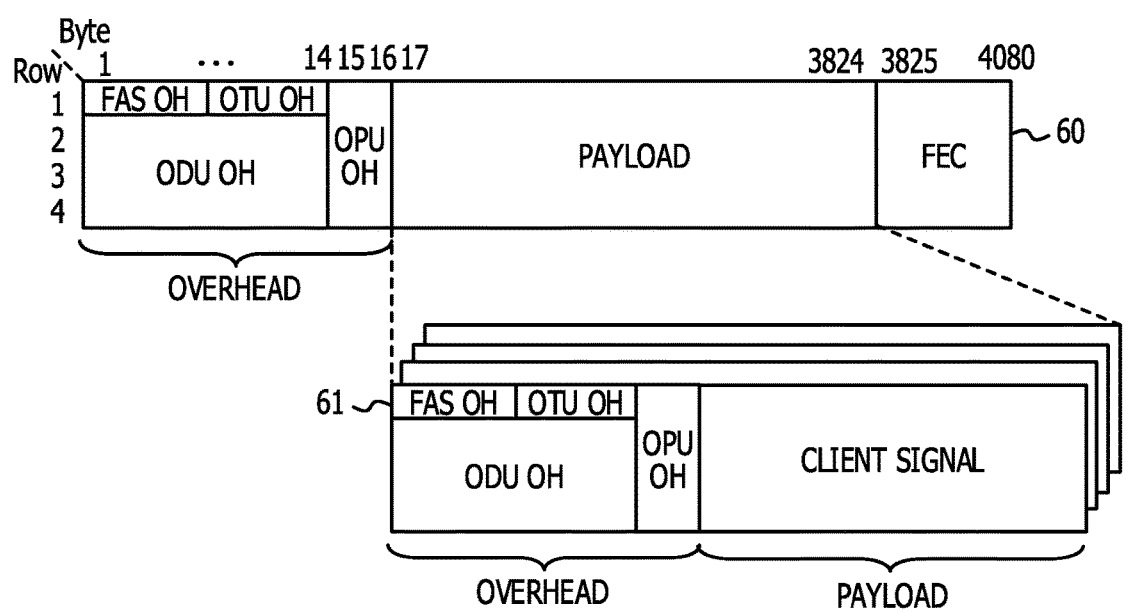
FIG. 3 is a diagram illustrating a structure of an OTU frame.

FIG. 3 is a diagram illustrating a structure of an OTU frame. An OTU frame 60 includes an overhead area, a payload area, and a Forward Error Correction (FEC) area. "OH" in FIG. 3 indicates an overhead.

The overhead area includes a frame alignment signal (FAS) overhead, an OTU overhead, an ODU overhead, and an optical channel payload unit (OPU) overhead. The FAS overhead is used for frame-synchronizing in the reception processing. Each of the OTU overhead and the ODU overhead includes monitoring information and control information. In addition, the FEC area includes the error-correcting code.

The payload area accommodates a plurality of ODU frames 61 so that the plurality of ODU frames 61 are multiplexed. The number of accommodated ODU frames 61 is determined based on a bandwidth of the OTU signal S, that is, the above-described ODUx. For example, when the bandwidth of the OTU signal S is the ODU2 (10 Gbps), the four ODU frames 61 of ODU1 (2.5 Gbps) may be accommodated.

The ODU frame 61 includes an overhead area and a payload area. Similar to the OTU frame 60, the overhead area includes a FAS overhead, an OTU overhead, an ODU overhead, and an OPU overhead. In addition, the payload area accommodates a client signal. The client signal is a target signal that is transmitted and received by a user, and in the example, the client signal corresponds to the above-described data signal DT.

FIG. 4 is a diagram illustrating an overhead. In FIG. 4, "Row" and "Byte" respectively correspond to "Row" and "Byte" in FIG. 3.

The ODU overhead includes REServed (RES), Path Monitoring (PM) & Tandem Connection Monitoring (TCM), a TCM Activation/deactivation Control Channel (ACT), TCM 1 to 6, and a Fault Type & Fault Location reporting channel (FTFL). The ODU overhead further includes PM, Experimental (EXP), GCC 1 and 2, and an Automatic Protection Switching coordination channel (APS)/Protection Communication Channel (PCC). The details of the above-described parameters are defined by the ITU-T recommendation G.709.

Referring to FIG. 2 again, when the received OTU signal S includes control information, the OTU reception unit 100 extracts the control information and outputs the extracted control information to the control unit 14. The control information is inserted, for example, into the GCC 1 and 2, the RES, or the like in the OTU frame 60. As described later, the control unit 14 executes processing that is related to setting of a transmission path of a data signal DT in accordance with a content of the control information.

The separation unit 101 separates one or more ODU frames 61 from the OTU frame 60. The separated and obtained ODU frames 61 are respectively input to the plurality of reception side ODU processing units 102. Each of the plurality of reception side ODU processing units 102 executes the reception processing of the ODU frame 61. In addition, the reception side ODU processing unit 102 extracts signal identification information from the ODU frame 61 and writes the extracted signal identification information into the first identification information storage unit 131.

The signal identification information is specific information that is used to identify a data signal DT. The data signal DT is accommodated in each of the ODU frames, so that an ODU signal Sd may be distinguished by referring to the signal identification information. The signal identification information may be included, for example, in the TCMi area (i=1 to 6) of the ODU overhead of the ODU frame 61 (see FIG. 4).

Figure 5:
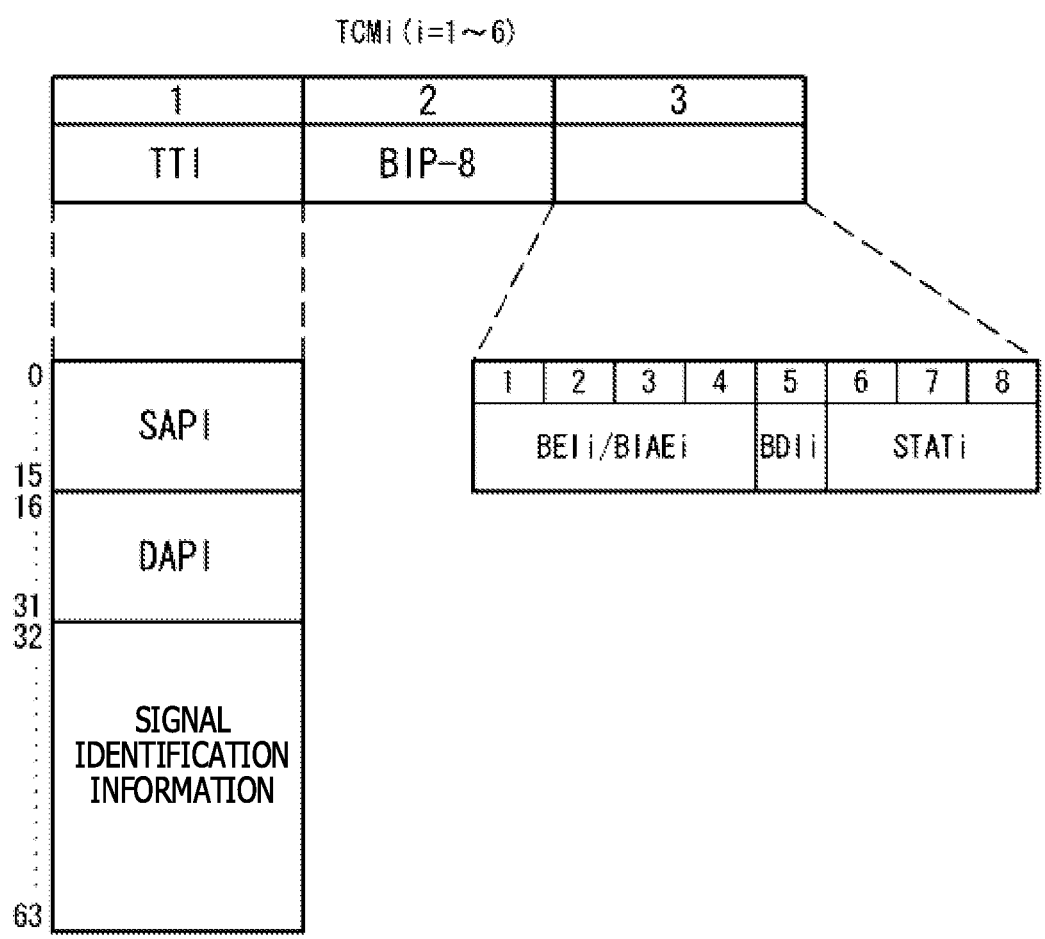
FIG. 5 is a diagram illustrating a structure of a TCMi area.

FIG. 5 is a diagram illustrating a structure of a TCMi area. Each of the TCM 1 to 6 includes a Trail Trace Identifier (TTI) and a Bit Interleaved Parity (BIP)-8. In addition, each of the TCM1 to 6 further includes Backward Error Indication (BEI) i/Backward Incoming Alignment Error (BIAE) i, Backward Defect Indication (BDI) i, and a Status (STAT) i (i=1 to 6).

The TTI includes a Source Access Point Identifier (SAPI), a Destination Access Point Identifier (DAPI), and signal identification information. The signal identification information is inserted into the ODU frame 61 by the server 90.

FIG. 6 is a table illustrating an example of a content of the first identification information storage unit 131. For example, FIG. 6 illustrates a case in which signal identification information of the data signal DT that has been received from the route #1 is "Music_Channel_1", and signal identification information of the data signal DT that has been received from the route #2 is "Video_Channel_1". As described above, the signal identification information may be represented using a given name, a sign, and a number.

The reception side ODU processing unit 102 may periodically extract the signal identification information each time the ODU frame 61 is received. For example, when the ODU frame 61 that includes the identical signal identification information is not received for a certain time period, the signal identification information stored in the first identification information storage unit 131 is autonomously deleted. Therefore, the control unit 14 may detect a data signal DT received by the transmission device 1, with reference to the signal identification information of the first identification information storage unit 131.

After the reception side ODU processing unit 102 has extracted the signal identification information, the reception side ODU processing unit 102 outputs the ODU frame 61 to the switch unit 13 as an ODU signal Sd. The switch unit 13 is a cross-connect switch that connects the reception processing unit 10 and the transmission processing unit 11.

The transmission processing unit 11 includes a plurality of transmission side ODU processing units 110, a multiplexing unit 111, and an OTU transmission unit 112. The reception side ODU processing unit 102 and the transmission side ODU processing units 110 and 120 are connected to each other through the switch unit 13.

The switch unit 13 cross-connects the reception side ODU processing unit 102 and the transmission side ODU processing units 110 and 120 in accordance with cross-connect setting from the control unit 14. Therefore, the control unit 14 may transmit an ODU signal Sd that has been received from each of the routes, to a given route, by setting the switch unit 13.

The switch unit 13 cross-connects the reception side ODU processing unit 102 to the transmission side ODU processing units 110 and 120, by one-to-one relationship (see symbol d1) or one-to-many relationship (see symbols d2 and d3). Therefore, the switch unit 13 may cause one ODU signal Sd to branch and output the branched signal to the plurality of routes.

Each of the plurality of transmission side ODU processing units 110 executes transmission processing of an ODU signal Sd. The ODU signal Sd for which the transmission processing has been executed is input to the multiplexing unit 111. The multiplexing unit 111 multiplexes the ODU frames 61 of a plurality of ODU signals Sd, and outputs the ODU frames 61 to the OTU transmission unit 112.

The OTU transmission unit 112 generates the OTU frame 60, and accommodates the ODU frames 61 that have been multiplexed by the multiplexing unit 111, in a payload area of the OTU frame 60.

In addition, the OTU transmission unit 112 inserts control information that has been generated by the control unit 14 into the OTU frame 60, in response to an instruction from the control unit 14. As described above, for example, the control information is inserted into the GCC 1 and 2 or RES in the header. The OTU transmission unit 112 transmits the OTU frame 60 to the corresponding route as an OTU signal S.

From among ODU signals Sd from the routes, an ODU signal Sd that includes a data signal DT transmitted to the reception device 91 is input from the switch unit 13 to the transmission side ODU processing unit 120. When failure information is included in the ODU frame 61, the transmission side ODU processing unit 120 extracts the failure information from the ODU frame 61 and outputs the extracted failure information to the failure detection unit 123. The failure information is included in the header of the ODU frame 61.

The failure detection unit 123 detects a transmission path failure, for example, based on an Alarm Indication Signal (AIS) of the failure information. In this case, the state of the transmission path becomes a state in which the transmission is not allowed to be performed, so that a data signal DT is not included in the ODU frame 61.

In addition, the transmission side ODU processing unit 120 extracts signal identification information from the ODU frame 61, and writes the extracted signal identification information into the second identification information storage unit 124. For example, as described above with reference to FIG. 5, the signal identification information is included in the TCMi area of the ODU overhead. Similar to the first identification information storage unit 131, the second identification information storage unit 124 stores signal identification information of a data signal DT received by the reception device 91, for each of the routes of the transmission source (see FIG. 6).

The transmission side ODU processing unit 120 may extract the signal identification information each time the ODU frame 61 is received, or periodically. The signal identification information stored in the second identification information storage unit 124 is held in order to reset the transmission path of a data signal DT when the data signal DT is not received due to occurrence of a transmission path failure. Therefore, the control unit 14 may detect a data signal DT that is not received due to the transmission path failure, that is, a requested data signal DT, by referring to the signal identification information of the second identification information storage unit 124.

The data extraction unit 121 extracts a data signal DT from the payload area of the ODU frame 61. The extracted data signal DT is input to the data transmission unit 122. The data transmission unit 122 transmits the data signal DT to the reception device 91.

The bandwidth information storage unit 130 stores a used bandwidth and an unused bandwidth for each of the routes, based on information that is input from the switch unit 13. In FIG. 7, an example of a content of the bandwidth information storage unit 130 is illustrated.

The used bandwidth and the unused bandwidth are represented as a bandwidth (ODUx) of the ODU frame 61 that is accommodated in the payload area of the OTU frame 60 and the number of ODU frames 61. For example, in the OTU frame 60 that is transmitted to the route #1 (here, it is assumed that the frame is the ODU2), three ODU0 are used, and five ODU0 are unused.

The control unit 14 may determine a bandwidth of a data signal DT that is transmitted to the reception device 91 and determine whether or not a transmission path of a requested data signal DT is set, with reference to the bandwidth information storage unit 130. A content of the bandwidth information storage unit 130 may be written from the network management system 92.

The control unit 14 is, for example, an arithmetic processing device such as a central processing unit (CPU), and controls an operation of the transmission device 1. When occurrence of a transmission path failure is notified from the failure detection unit 123, the control unit 14 executes resetting processing of a transmission path of a data signal DT. Initial setting of the transmission path is executed, for example, for the switch unit 13 of each of the transmission devices 1 by the network management system 92.

In the setting processing of a transmission path, the control unit 14 generates various pieces of control information, and outputs the generated information to the OTU transmission unit 112. The OTU transmission unit 112 inserts the input control information into the ODU overhead of the OTU frame 60, and transmits the frame to a further transmission device 1. In addition, the control unit 14 obtains the control information that has been transmitted from the further transmission device 1, from the OTU reception unit 100.

Figure 8:
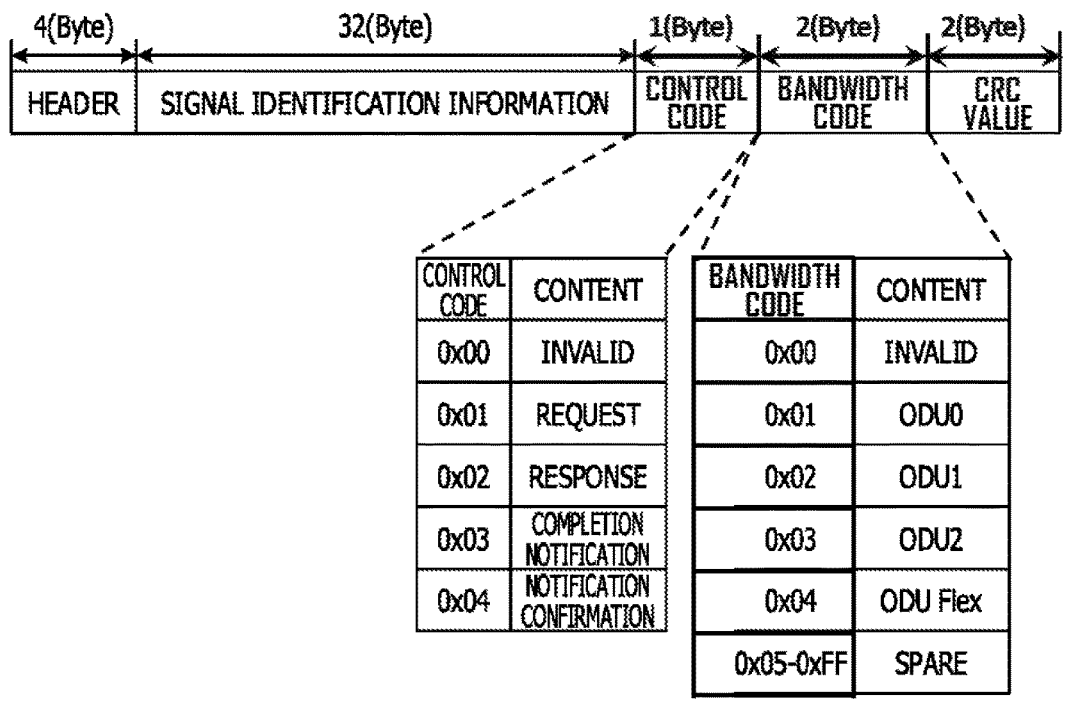
FIG. 8 is a diagram illustrating a structure example of control information.

FIG. 8 is a diagram illustrating control information. The control information includes, for example, a header of 4 bytes, signal identification information of 32 Bytes, a control code of 1 Byte, a bandwidth code of 2 Bytes, and a Cyclic Redundancy Check (CRC) value of 2 Bytes.

The header includes a specific data pattern that is used to identify control information by the OTU reception unit 100. A data pattern of the header is not limited, but for example, may be "0x5A5A5A5A". Here, "0x" indicates a hexadecimal number.

The signal identification information indicates a data signal DT that is a setting target of a transmission path. The control code indicates a content by the control information. When the control code is "0x00", the control information is invalid, that is, it is indicated that the any processing is not executed.

When the control code is "0x01", the control information indicates a request of a data signal DT from the request side transmission device 1. The requested data signal DT is determined by the signal identification information. In the following description, an OTU signal S that includes control information in which the control code is "0x01" is referred to as "request signal".

When the control code is "0x02", the control information indicates a response from the non-request side transmission device 1 for the request signal. In the following description, an OTU signal S that includes control information in which the control code is "0x02" is referred to as "response signal".

When the control code is "0x03", the control information indicates that reception of a requested data signal DT has been completed in the request side transmission device 1. In the flowing description, an OTU signal S that includes the control information in which the control code is "0x03" is referred to as "completion notification signal".

When the control code is "0x04", the control information indicates that a completion notification signal has been confirmed in the non-request side transmission device 1. In the following description, an OTU signal S that includes control information in which the control code is "0x04" is referred to as "notification confirmation signal".

The bandwidth code indicates a bandwidth of a requested data signal DT, and is used in the case of a request signal. When the bandwidth code is "0x00", a bandwidth of the requested data signal DT is invalid (for example, a bandwidth value in which processing is not allowed be performed).

When the bandwidth code is "0x01", a bandwidth of the requested data signal DT is the ODU0 (1.25 Gbps). When the bandwidth code is "0x02", a bandwidth of the requested data signal DT is the ODU1 (2.5 Gbps). When the bandwidth code is "0x03", a bandwidth of the requested data signal DT is the ODU2 (10 Gbps). When the bandwidth code is "0x04", a bandwidth of the requested data signal DT is an ODU Flex (flexible bandwidth depending on a client signal). Here, "0x05" to "0xFF" are used as a spare.

The CRC value is an error detection symbol that is used to detect a data error of a header, signal identification information, a control code, and a bandwidth code. The control unit 14 may correct an error of 1 Bit or 2 Bits that occurs in the control information using the CRC value.

In the setting of a transmission path, the processing of the control unit 14 is different between the request side transmission device 1 and the non-request side transmission device 1. The control unit 14 of the request side transmission device 1 detects the non-request side transmission device 1 that has received a data signal DT that is identical to the data signal DT that has been requested to the transmission device 1, and transmits the data signal DT to branch from the detected non-request side transmission device 1 to the transmission device 1. On the other hand, the control unit 14 of the non-request side transmission device 1 transmits the received data signal to branch to the request side transmission device 1 when the non-request side transmission device 1 is detected by the request side transmission device 1. In the following description, the detailed operations of the control units 14 of the request side transmission device 1 and the non-request side transmission device 1 are described respectively.

In the request side transmission device 1, the control unit 14 obtains signal identification information of a data signal DT that is not allowed to be received due to a transmission path failure, from the second identification information storage unit 124, when occurrence of a transmission path failure or the like is notified from the failure detection unit 123. In addition, the control unit 14 obtains bandwidth information (ODUx and the like) of the data signal DT, from the bandwidth information storage unit 130. The control unit 14 generates a request signal that includes the obtained signal identification information and bandwidth information, and transmits the generated request signal to routes other than the route on the reception device 91 side.

On the other hand, in the non-request side transmission device 1, the control unit 14 refers to the signal identification information of the first identification information storage unit 131 when reception of a request signal is notified from the OTU reception unit 100. In addition, the control unit 14 determines whether or not the transmission device 1 has received a requested data signal DT, based on the signal identification information that is included in the request signal. In addition, the control unit 14 determines whether or not a bandwidth of the requested data signal DT is obtained, based on the bandwidth code included in the request signal, with reference to the bandwidth information storage unit 130.

When the control unit 14 receives the data signal DT, and the bandwidth is obtained, the control unit 14 sets the switch unit 13 so that the data signal DT is caused to branch to the request side transmission device 1. As a result, the switch unit 13 cross-connects the reception side ODU processing unit 102 and the transmission side ODU processing units 110 and 120 so that the ODU signal Sd including the data signal DT is caused to branch to two routes (see symbols d2 and d3). One of the two routes is the original transmission destination (transmission destination before the transmission path failure occurs) of the ODU signal Sd that includes the requested data signal DT, and the other route is a route that is destined for the request side transmission device 1.

In addition, the control unit 14 generates a response signal, and transmits the generated response signal to the request side transmission device 1. At that time, signal identification information included in the response signal corresponds to signal identification information included in the received request signal.

In addition, the control unit 14 may obtain a bandwidth, but forwards a received request signal to a further transmission device 1 other than the request side transmission device 1 when the transmission device 1 does not receive a data signal that is identical to the requested data signal DT. At that time, the control unit 14 replicates the request signal that has been notified from the OTU reception unit 100, and outputs the replicated request signal to the OTU transmission unit 112. In this case, even in the subsequent processing, similarly, the control unit 14 replicates further control information and forwards the replicated control information, and when a branched data signal DT is further received, the control unit 14 sets the switch unit 13 so that the data signal DT is forwarded to the request side transmission device 1.

In the request side transmission device 1, when reception of a response signal is notified from the OTU reception unit 100, the control unit 14 sets the switch unit 13 so that an ODU signal Sd (data signal DT) that has been transmitted from the non-request side transmission device 1 that is the transmission source of the response signal is transmitted to the reception device 91. At that time, the switch unit 13 cross-connects the reception side ODU processing unit 102 of the route of the transmission source of the response signal to the transmission side ODU processing unit 120 of the route on the reception device 91 side. In addition, the data transmission unit 122 transmits a data signal DT that has been transmitted from the non-request side transmission device 1, to the reception device 91.

When response signals are received from the plurality of non-request side transmission devices 1, the control unit 14 controls a data signal DT of the transmission device 1 that has transmitted a response signal that is received earliest, to branch to the transmission device 1. That is, the control unit 14 selects a data signal DT that has been transmitted from the transmission device 1 that is the transmission source of the response signal that is received earliest, from among data signals DT that have been transmitted from the plurality of non-request side transmission devices 1. Therefore, the control unit 14 transmits a completion notification signal to a further non-request side transmission device 1 that has transmitted a data signal DT in response to the request signal in order to stop the transmission. As a result, conflict of transmission of data signals DT between the plurality of non-request side transmission devices 1 is avoided, so that wasteful use of a bandwidth may be avoided.

In the non-request side transmission device 1, when reception of a completion notification signal is notified from the OTU reception unit 100, the control unit 14 sets the switch unit 13 so that branching of an ODU signal Sd that includes a data signal DT that is identical to the requested data signal DT is stopped. For example, the control unit 14 sets the switch unit 13 so that cross-connect of the transmission side ODU processing units 110 and 120 that correspond to the route of the request side transmission device 1 from among two routes that are branch destinations of the ODU signal Sd is released. After completion of the setting, the control unit 14 generates a notification confirmation signal, and transmits the generated notification confirmation signal to the request side transmission device 1.

An application example of the embodiment is described below with reference to FIGS. 9 to 12. In the example, it is assumed that the transmission device 1 of the node (3-2) is the request side transmission device 1.

Figure 9:
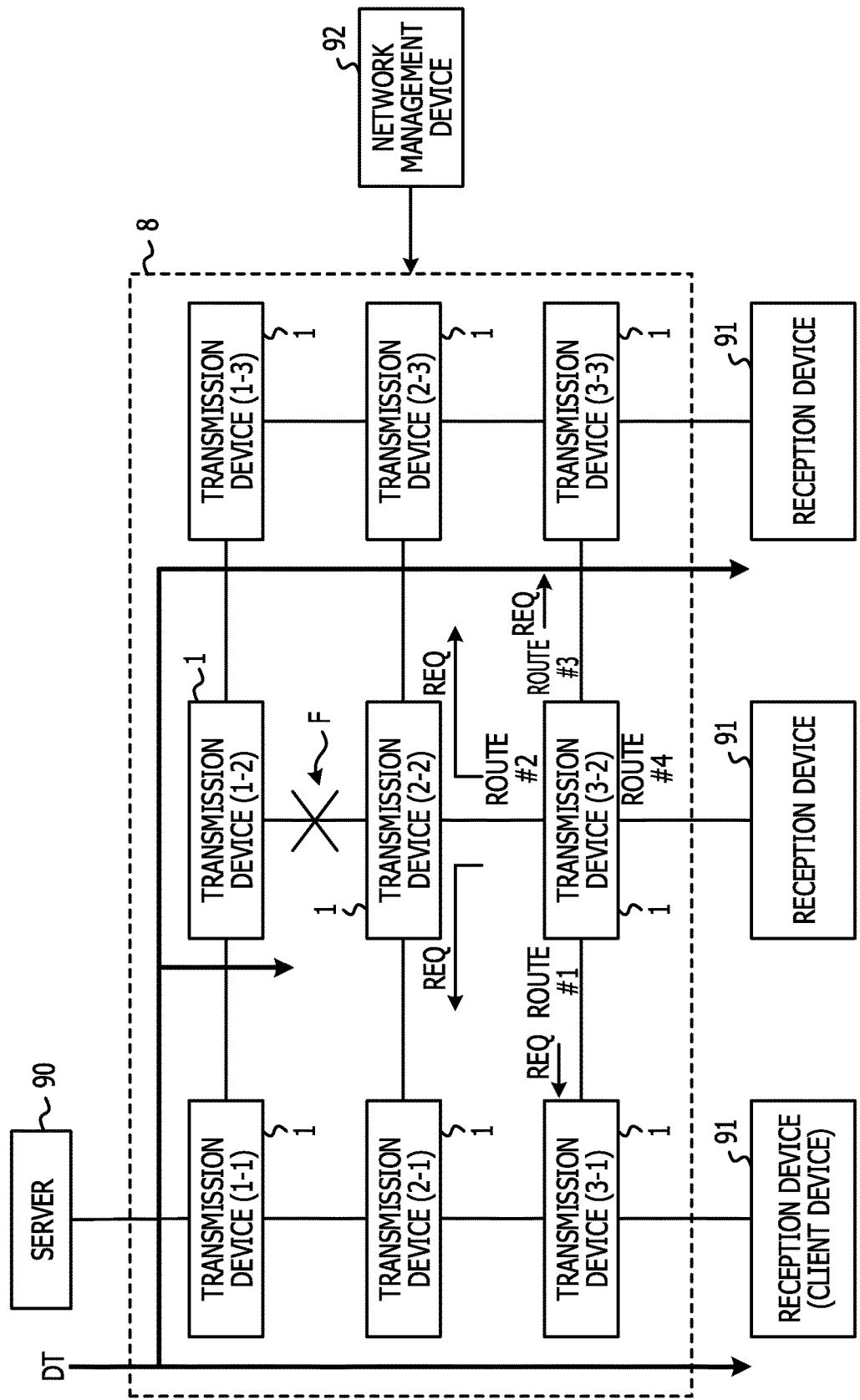
FIG. 9 is a diagram illustrating an application example of the first embodiment.

As illustrated in FIG. 9, when a transmission path failure F occurs in the transmission path between the node (1-2) and the node (2-2), the transmission device 1 of the node (2-2) transmits a notification signal such as an AIS, to the request side transmission device 1. Here the example of a failure includes a transmission path failure F, but the failure is not limited to such an example, and may include a further failure such as a device failure of the transmission device 1.

When the request side transmission device 1 detects occurrence of a transmission path failure F by the failure detection unit 123, the request side transmission device 1 transmits a request REQ to the routes #1 to #3 in order to detect a further transmission device (non-request side transmission device) 1 that has received a data signal DT that is identical to a data signal DT that is not allowed to be received. The route #4 is a route destined for the reception device 91, so that a request signal is not transmitted to the route #4.

The transmission devices 1 of the nodes (3-1) and (3-3) receive a data signal DT that is identical to the requested data signal DT, so that the request signal REQ is processed in the transmission device 1. On the other hand, the transmission device 1 of the node (2-2) does not receive the data signal that is identical to the requested data signal DT, so that a request signal REQ is forwarded to the transmission devices 1 of the adjacent nodes (2-1) and (2-3).

Figure 10:
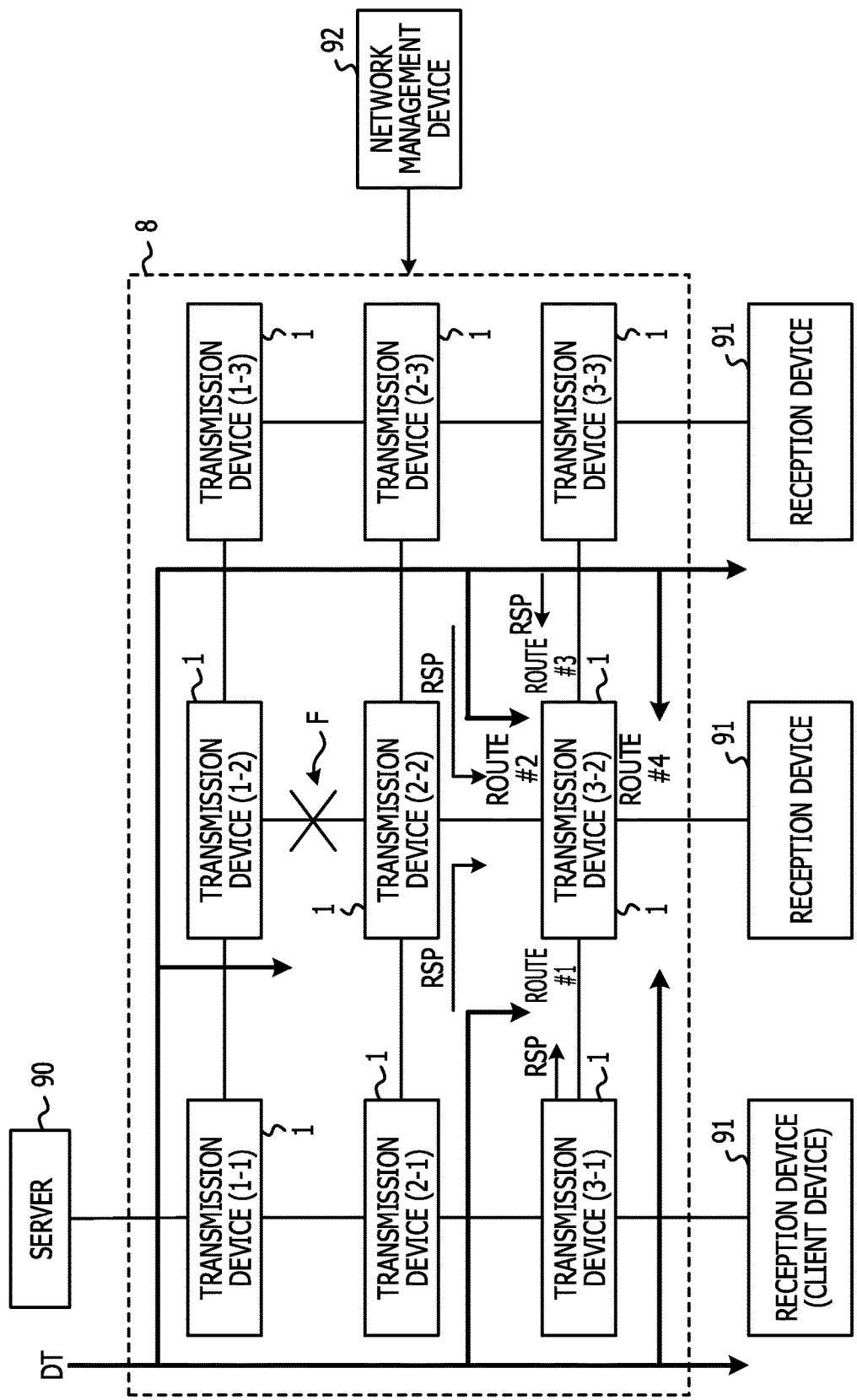
FIG. 10 is a diagram illustrating an application example of the first embodiment.

As illustrated in FIG. 10, each of the transmission devices 1 of the nodes (2-1), (2-3), (3-1) and (3-3) that have received the request signal REQ transmits a response signal RSP to the request side transmission device 1. In addition, each of the transmission devices 1 of the nodes (2-1), (2-3), (3-1), and (3-3) transmits a requested data signal DT to branch to the request side transmission device 1, by the setting of the switch unit 13. At that time, the transmission device 1 of the node (2-2) forwards the data signal DT and the response signal RSP from each of the transmission devices 1 of the nodes (2-1) and (2-3), to the request side transmission device 1.

Figure 11:
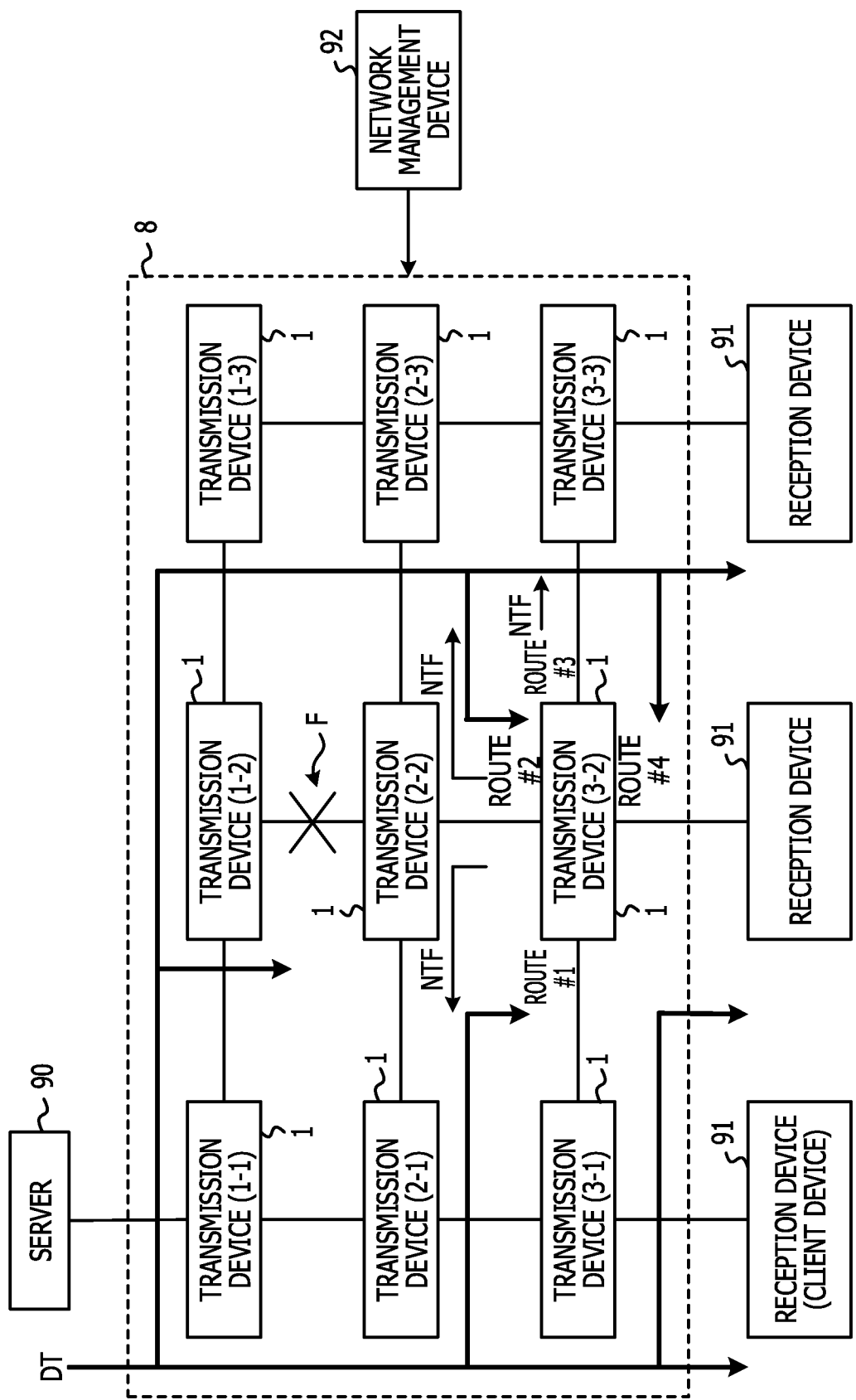
FIG. 11 is a diagram illustrating an application example of the first embodiment.

As illustrated in FIG. 11, based on the setting of the switch unit 13, the request side transmission device 1 transmits a data signal DT of the transmission device 1 that has transmitted a response signal RSP received earliest (hereinafter referred to as "earliest transmission device"), from among the response signals RSP received from the plurality of non-request side transmission devices 1, to the reception device 91. In the example, it is assumed that the transmission device 1 of the node (3-1) is the earliest transmission device 1.

In addition, the request side transmission device 1 transmits a completion notification signal NTF, to the non-request side transmission devices 1 other than the earliest transmission device 1, that is, the transmission devices 1 of the nodes (2-1), (2-3), and (3-3). At that time, the transmission device 1 of the node (2-2) forwards the completion notification signal NTF to the transmission devices 1 of the nodes (2-1) and (2-3).

Figure 12:
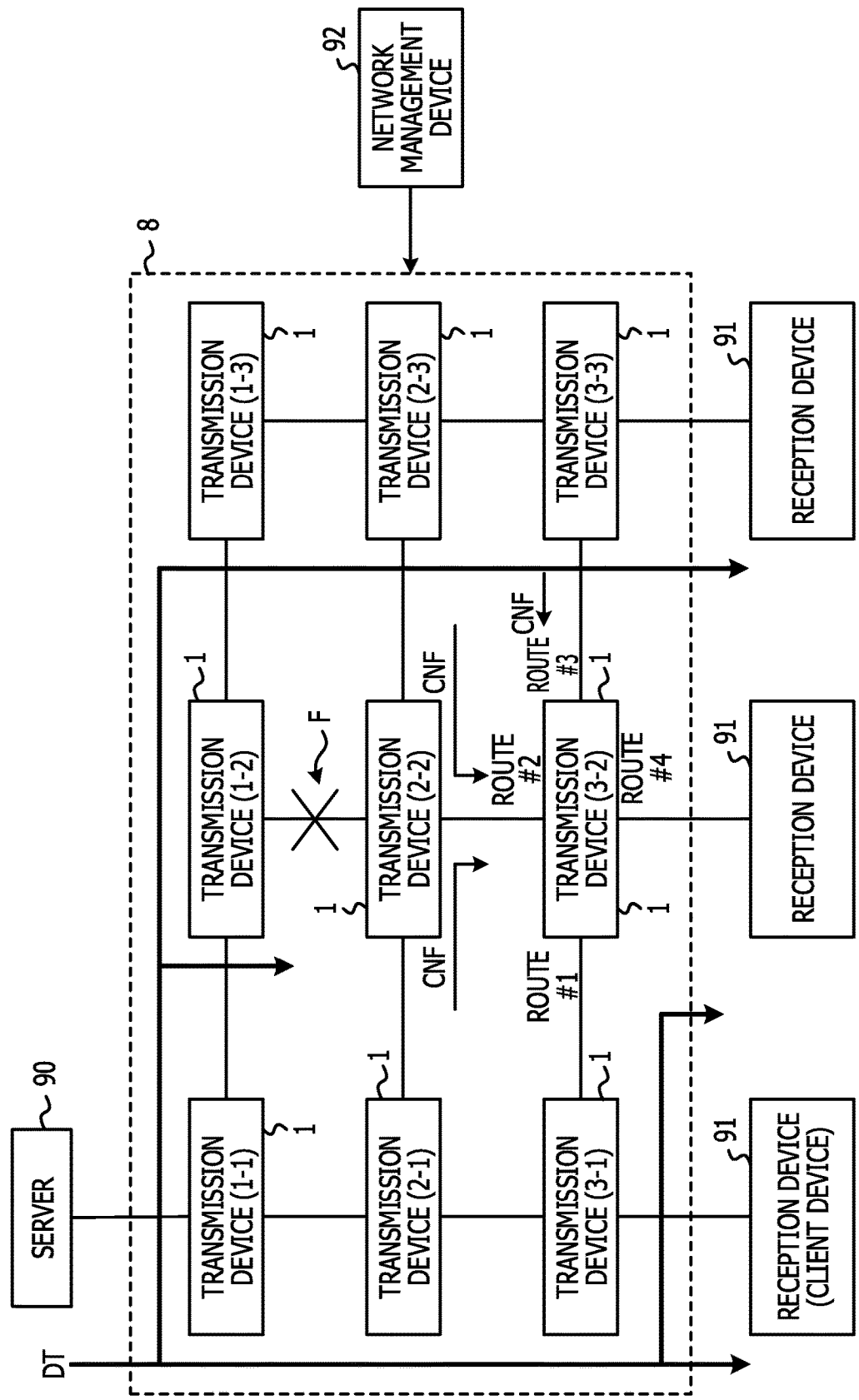
FIG. 12 is a diagram illustrating an application example of the first embodiment.

As illustrated in FIG. 12, the non-request side transmission device 1 that has received the completion notification signal NTF stops transmission of a data signal DT to the request side transmission device 1. After the transmission is stopped, the non-request side transmission device 1 transmits a notification confirmation signal CNF, to the request side transmission device 1. When the request side transmission device 1 receives the notification confirmation signal CNF, the request side transmission device 1 stops the transmission of completion notification signal NTF. As described above, the request side transmission device 1 resets a transmission path of the data signal DT that is not allowed to be received due to a transmission path failure F.

Figure 13:
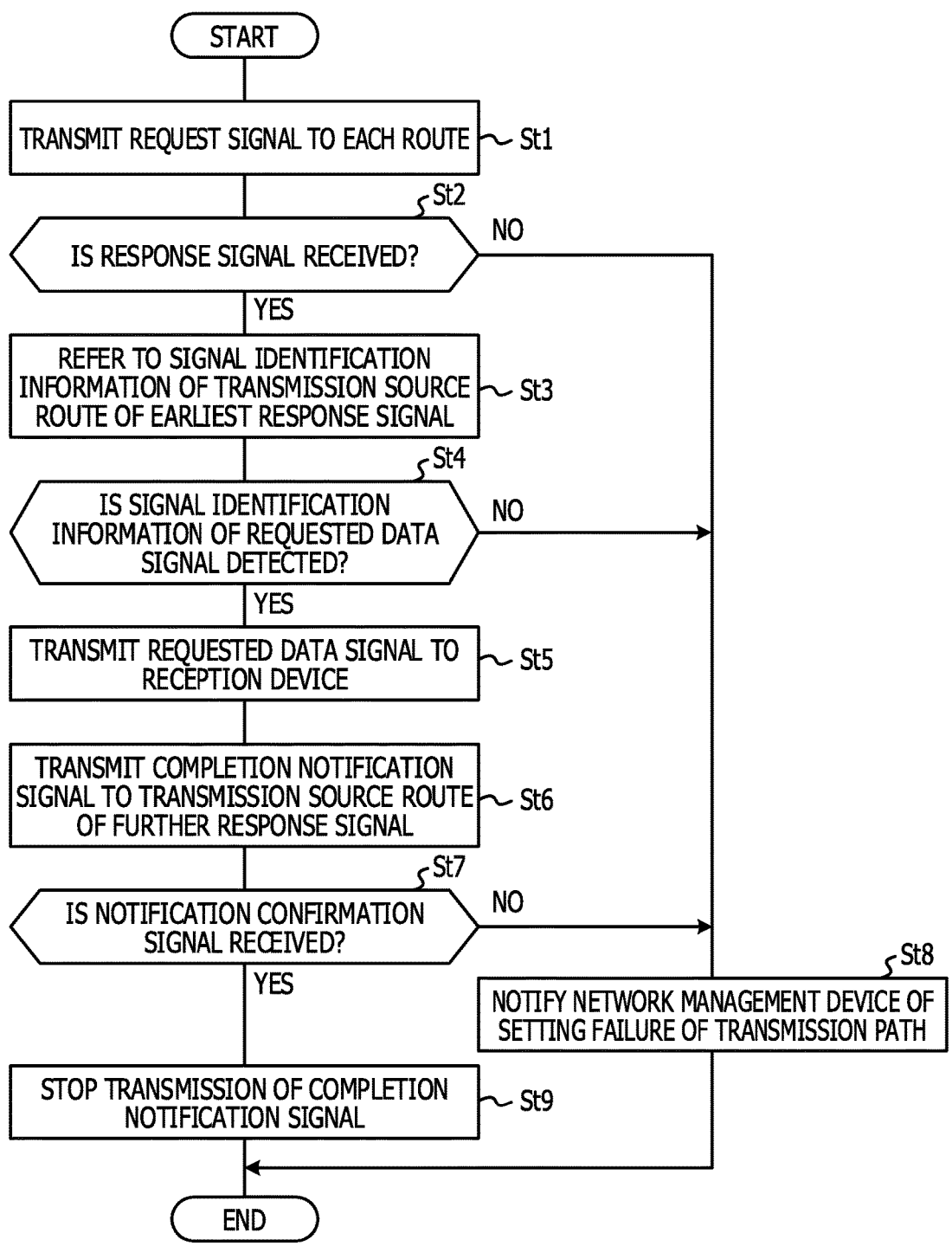
FIG. 13 is a flowchart illustrating an operation of a request-side transmission device according to the first embodiment.

FIG. 13 is a flowchart illustrating an operation of the request side transmission device 1 according to the first embodiment. The processing illustrated in the flowchart is executed by the control unit 14 when a transmission path failure is detected by the failure detection unit 123.

First, the control unit 14 transmits a request signal REQ to each of the routes (Step St1). At that time, the control unit 14 obtains signal identification information of a requested data signal DT from the second identification information storage unit 124, obtains a bandwidth of the requested data signal DT from the bandwidth information storage unit 130, and generates a request signal REQ.

The control unit 14 determines the presence or absence of reception of a response signal RSP from a further transmission device 1 (Step St2). When a response signal RSP is not received within a certain time period after transmission of the request signal REQ (No in Step St2), the control unit 14 notifies the network management system 92 of setting failure of a transmission path (Step St8).

On the other hand, when a response signal RSP is received within the certain time period after transmission of the request signal REQ (Yes in Step St2), the control unit 14 refers to signal identification information of a route of a transmission source of the earliest response signal RSP, from among the plurality of response signals RSP (Step St3). As described above, the signal identification information is stored in the first identification information storage unit 131, for each of the routes.

The control unit 14 detects whether or not signal identification information of a data signal DT that has been requested to the transmission device 1 is stored in the first identification information storage unit 131 (Step St4). That is, the control unit 14 determines whether or not an ODU signal including a requested data signal DT is transmitted from a further transmission device 1 that has received a request signal REQ to the transmission device 1, with reference to the first identification information storage unit 131.

When signal identification information of the requested data signal DT is not detected within the certain time period (No in Step St4), the control unit 14 notifies the network management system 92 of setting failure of a transmission path (Step St8). In this case, instead of notification of the setting failure, in the control unit 14, the flow returns to the processing Step St3, and the control unit 14 may detect signal identification information of a transmission source route of a further response signal RSP.

When signal identification information of the requested data signal DT is detected within the certain time period (Yes in Step St4), the control unit 14 transmits a data signal DT included in an ODU signal Sd that has been transmitted from the transmission device 1 that is the transmission source of a response signal RSP, to the reception device 91 (Step St5). At that time, the control unit 14 sets the switch unit 13 so that the reception side ODU processing unit 102 of the reception processing unit 10 of the route of the transmission device 1 is cross-connected to the transmission side ODU processing unit 120 of the route on the reception device side. As a result, a transmission path that ranges from the detected further transmission device 1 to the reception device 91 is set, so that the transmission of the data signal DT, which has been interrupted due to the transmission path failure F, is resumed.

The control unit 14 transmits a completion notification signal NTF, to a route of a transmission source of a further response signal RSP (response signal RSP other than the earliest response signal RSP) (Step St6). That is, the control unit 14 transmits a completion notification signal NTF to the transmission device 1 other than the transmission device 1 that is a transmission source of the requested data signal DT. The completion notification signal NTF is kept to be transmitted for a certain time period. When one response signal RSP is merely received, the processing is not executed, and in the control unit 14, the processing ends.

The control unit 14 determines the presence or absence of reception of a notification confirmation signal CNF from the transmission device 1 that is the transmission destination of the completion notification signal NTF (Step St7). Here, the control unit 14 made the determination for each of the corresponding transmission devices 1.

When a notification confirmation signal CNF is not received within the certain time period (No in Step St7), the control unit 14 notifies the network management system 92 of setting failure of a transmission path (Step St8). On the other hand, when notification confirmation signal CNF is received within the certain time period (Yes in Step St7), the control unit 14 stops transmission of the completion notification signal NTF (Step St9). As described above, the request side transmission device 1 executes the setting processing of a transmission path.

Figure 14:
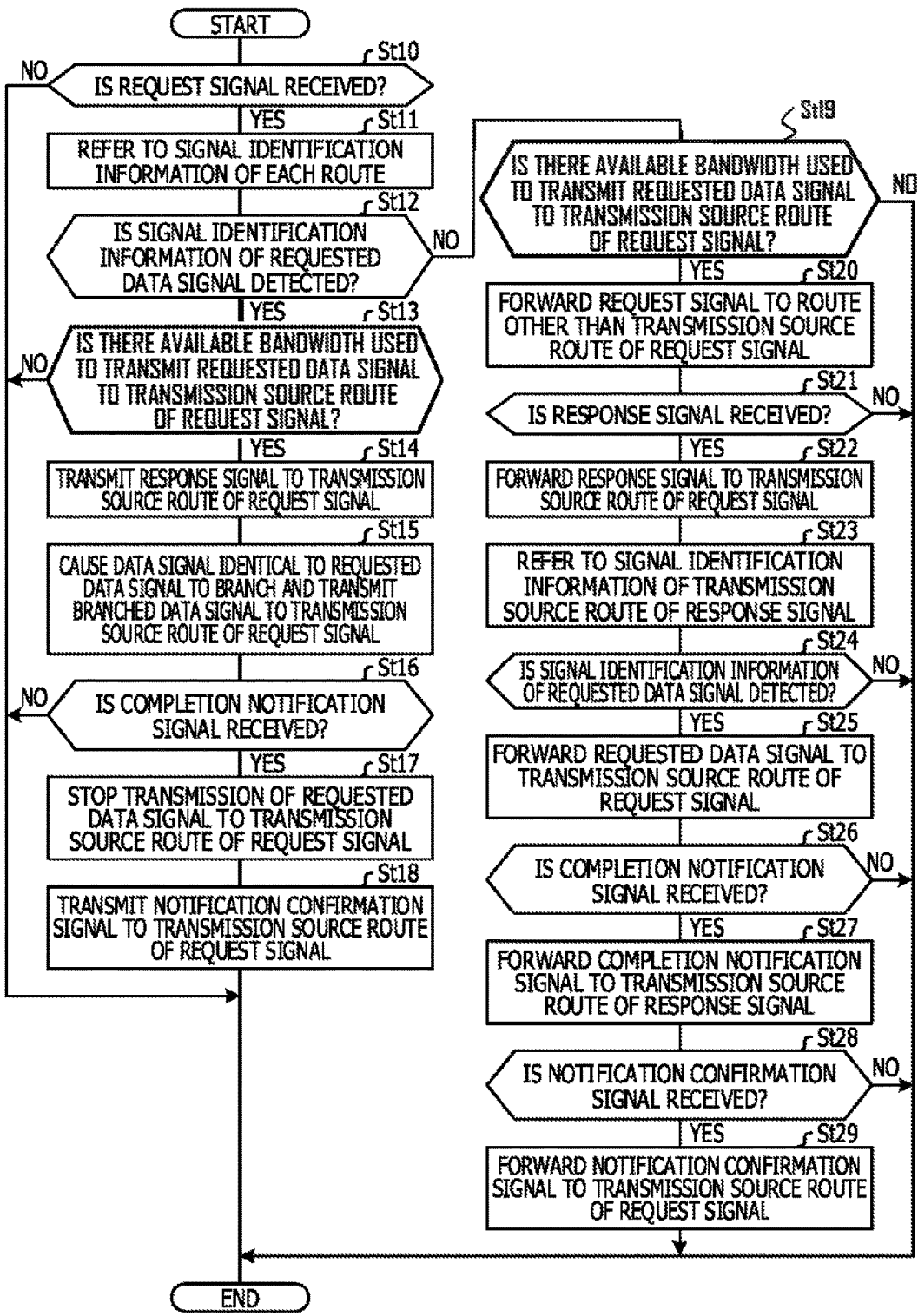
FIG. 14 is a flowchart illustrating an operation of a non-request side transmission device according to the first embodiment.

On the other hand, FIG. 14 is a flowchart illustrating an operation of the non-request side transmission device 1 according to the embodiment. When the control unit 14 receives a request signal REQ (Yes in Step St10), the control unit 14 refers to signal identification information of each of the routes (Step St11).

The control unit 14 detects whether or not signal identification information of the requested data signal DT is stored in the first identification information storage unit 131 (Step St12). That is, the control unit 14 detects whether or not the transmission device 1 has received a data signal DT that is indicated by signal identification information included in the request signal REQ (data signal that is identical to the requested data signal DT), with reference to the first identification information storage unit 131.

When signal identification information of the requested data signal DT is detected (Yes in Step St12), the control unit 14 checks the presence or absence of a available bandwidth that is used to transmit the requested data signal DT to a transmission source route of the request signal REQ, with reference to the bandwidth information storage unit 130 (Step St13). That is, the control unit 14 determines whether or not a bandwidth indicated by a bandwidth code that is included in the request signal REQ is obtained for the corresponding route, with reference to the bandwidth information storage unit 130.

When there is no available bandwidth (No in Step St13), in the control unit 14, the processing ends. On the other hand, when there is a available bandwidth (Yes in Step St13), the control unit 14 transmits a response signal RSP to the route of the transmission source of the request signal REQ (Step St14).

As described above, the non-request side transmission device 1 searches for signal identification information that corresponds to the signal identification information included in the request signal REQ, from pieces of signal identification information that are used to identify a data signal DT that has been received by the transmission device 1. In addition, when the corresponding signal identification information is found, the non-request side transmission device 1 transmits a response signal RSP to the request side transmission device 1. Therefore, the request side transmission device 1 easily detects a further transmission device 1 that has received a data signal DT that has been requested to the transmission device 1 with reference to the comparison result of the pieces of signal identification information.

The control unit 14 controls a data signal DT that is identical to the requested data signal DT (ODU signal Sd) to branch, and transmits the branched data signal to the route of the transmission source of the request signal REQ (Step St15). At that time, the control unit 14 sets the switch unit 13 so that the data signal DT that is identical to the requested data signal DT (ODU signal Sd) is caused to branch to the original route and a route that is destined for the request side transmission device 1 (see symbols d2 and d3 in FIG. 2).

The control unit 14 determines the presence or absence of reception of a completion notification signal NTF from the request side transmission device 1 (Step St16). When a completion notification signal NTF is not received within a certain time period (No in Step St16), in the control unit 14, the processing ends.

On the other hand, when a completion notification signal NTF is received within the certain time period (Yes in Step St16), the control unit 14 stops transmission of a requested data signal DT (ODU signal Sd) to the route of the transmission source of the request signal REQ (Step St17). At that time, the control unit 14 sets the switch unit 13 so that the requested data signal DT (ODU signal Sd) is merely transmitted to the original route.

The control unit 14 transmits a notification confirmation signal CNF to the route of the transmission source of the request signal REQ (Step St18). In the control unit 14, the processing ends.

On the other hand, when signal identification information of the requested data signal DT is not detected (No in Step St12), the non-request side transmission device 1 operates as a forward device that forwards control information and a data signal DT (ODU signal Sd). The operation corresponds to an operation of the transmission device 1 of the node (2-2) illustrated in FIGS. 9 to 12.

First, the control unit 14 checks the presence or absence of a available bandwidth that is used to transmit a requested data signal DT to a transmission source route of a request signal REQ, with reference to the bandwidth information storage unit 130 (Step St19). The processing is similar to the above-described processing of Step St13, and may be integrated with the processing of Step St13, and, for example, the integrated pieces of processing may be executed after Step St10.

When there is no available bandwidth (No in Step St19), in the control unit 14, the processing ends. On the other hand, when there is a available bandwidth (Yes in Step St19), the control unit 14 forwards the request signal REQ to the routes other than the route of the transmission source of the request signal REQ (Step St20).

As described above, when signal identification information that corresponds to the signal identification information included in the request signal REQ is not found, the non-request side transmission device 1 forwards the request signal REQ to a further transmission device 1. Thus, the request side transmission device 1 may detect a further transmission device 1 that has received a data signal that is identical to the requested data signal DT even when the transmission device 1 of the adjacent node does not receive a data signal that is identical to the requested data signal DT.

The control unit 14 determines the presence or absence of reception of a response signal RSP (Step St21). When a response signal RSP is not received within a certain time period (No in Step St21), in the control unit 14, the processing ends. On the other hand, a response signal RSP is received within the certain time period (Yes in Step St21), the control unit 14 forwards the received response signal RSP, to the route of the transmission source of the request signal REQ (Step St22).

The control unit 14 refers to signal identification information of the route of the transmission source of the response signal RSP (Step St23). The control unit 14 detects whether or not signal identification information of the requested data signal DT is stored in the first identification information storage unit 131 (Step St24). That is, the control unit 14 detects whether or not the transmission device 1 has received a data signal DT that is indicated by the signal identification information included in the request signal REQ (data signal that is identical to the requested data signal DT), with reference to the signal identification information of the first identification information storage unit 131.

When signal identification information of the requested data signal DT is not detected (No in Step St24), in the control unit 14, the processing ends. On the other hand, when signal identification information of the requested data signal DT is detected (Yes in Step St24), the control unit 14 forwards the requested data signal DT (ODU signal Sd), to the route of the transmission source of the request signal REQ (Step St25). At that time, the control unit 14 sets the switch unit 13 so that the requested data signal DT (ODU signal Sd) is transmitted to the route of the transmission source of the request signal REQ.

The control unit 14 determines the presence or absence of reception of a completion notification signal NTF (Step St26). When a completion notification signal NTF is not received within a certain time period (No in Step St26), in the control unit 14, the processing ends. On the other hand, a completion notification signal NTF is received within the certain time period (Yes in Step St26), the control unit 14 forwards the received completion notification signal NTF, to the route of the transmission source of the response signal RSP (Step St27).

The control unit 14 determines the presence or absence of reception of a notification confirmation signal CNF (Step St28). When a notification confirmation signal CNF is not received within a certain time period (No in Step St28), in the control unit 14, the processing ends. On the other hand, a notification confirmation signal CNF is received within the certain time period (Yes in Step St28), the control unit 14 forwards the received notification confirmation signal CNF, to the route of the transmission source of the completion notification signal NTF (Step St29). As described above, the non-request side transmission device 1 executes the setting processing of a transmission path.

As described above, in the embodiment, the control unit 14 of the request side transmission device 1 transmits a request signal REQ including signal identification information that is used to identify a data signal DT that has been requested to the transmission device 1, to a further transmission device 1. In addition, when the control unit 14 receives a response signal RSP for the request signal REQ, from the further transmission device 1, the control unit 14 detects a further transmission device 1 that has received a data signal DT that is identical to the data signal DT that has been requested to the transmission device 1.

In the transmission device 1 according to the embodiment, even when a node configuration is unknown in the network 8, a further transmission device 1 that has received a data signal that is identical to the requested data signal DT may be detected by the response signal RSP for the request signal REQ.

Second Embodiment

In the above-described embodiment, the control unit 14 detects a further transmission device 1 that has received a data signal that is identical to a requested data signal DT by a response signal RSP for a request signal REQ, but the embodiment is not limited to such an example. For example, as described below, the control unit 14 may further rapidly detect a further transmission device 1 that has received a data signal that is identical to the requested data signal DT using a management table that manages identification information of the transmission device 1.

Figure 15:
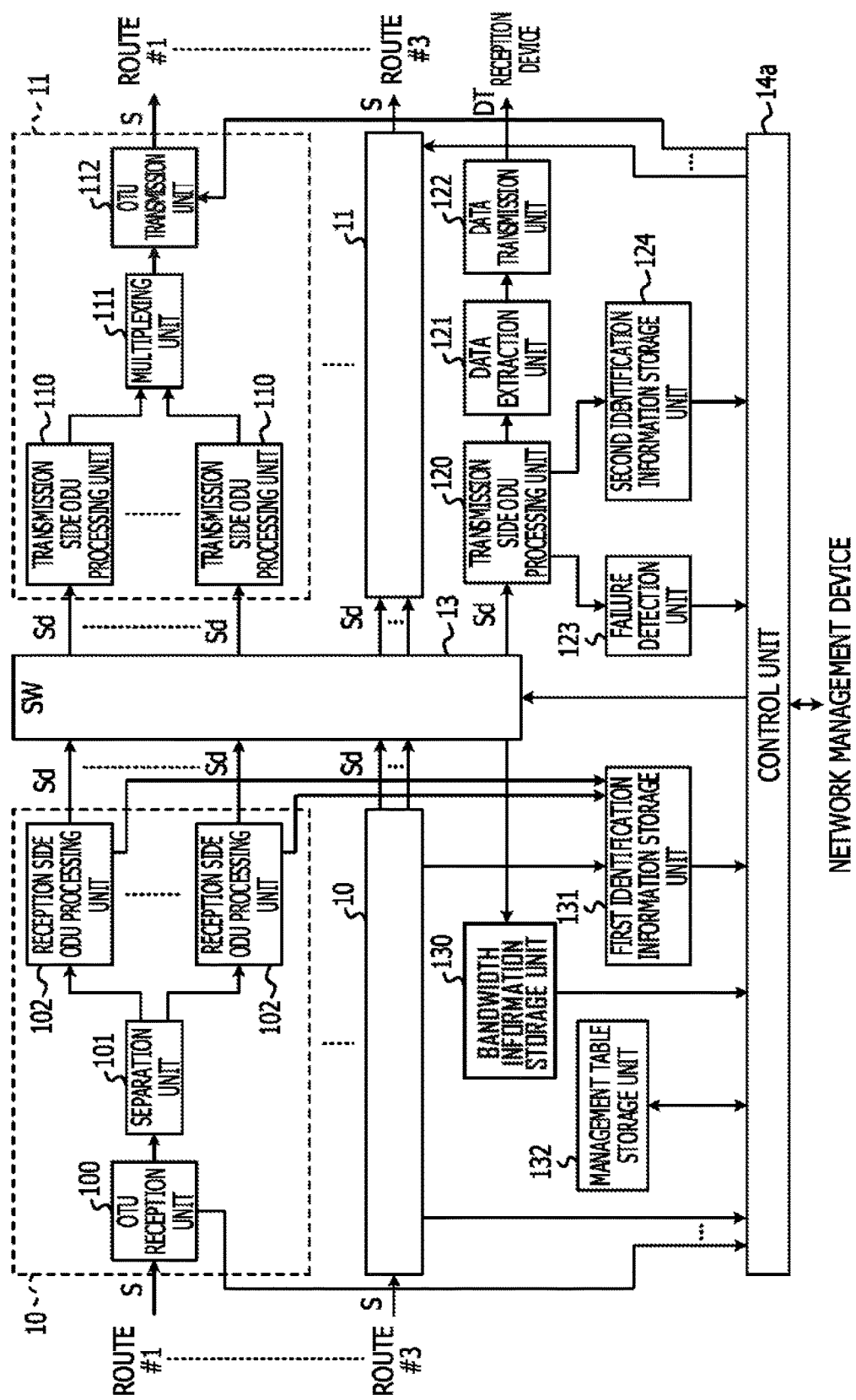
FIG. 15 is a diagram illustrating a structure of a transmission device according to a second embodiment.

FIG. 15 is a diagram illustrating a structure of the transmission device 1 according to the embodiment. In FIG. 15, the same symbol is assigned to a configuration that is similar to the configuration in FIG. 2, and the description is omitted herein.

The transmission device 1 includes the plurality of reception processing units 10, the plurality of the transmission processing units 11, the switch unit 13, and a control unit 14a. The transmission device 1 further includes the bandwidth information storage unit 130, the first identification information storage unit 131, the transmission side ODU processing unit 120, the data extraction unit 121, the data transmission unit 122, the failure detection unit 123, the second identification information storage unit 124, and a management table storage unit (storage unit) 132.

Differently from the first embodiment, in the request side transmission device 1, the control unit 14a does not transmit a request signal REQ to the routes, and merely transmits a request signal REQ to the detected further transmission device 1 with reference to the management table storage unit 132. Further processing of the control unit 14a (processing and the like of the response signal RSP) is similar to the control unit 14 according to the first embodiment.

The management table storage unit 132 stores a management table of device identification information that is used to identify a further transmission device 1 that has received a data signal DT that is identical to the data signal DT that has been requested to the transmission device 1. A content of the management table is set, for example, by the network management system 92. In FIG. 16, an example of a content of the management table is illustrated.

In FIG. 16, "node" indicates a node number of the transmission device 1, and "signal identification information" indicates signal identification information of a data signal DT that has been requested to the transmission device 1. In addition, "request target node" indicates a node number (device identification information) of a transmission destination of a request signal REQ, and "route" indicates a route of the node, which is viewed from the transmission device 1 that is indicated by the above-described "node". In addition, "request target node" is associated with "priority level" for each of the devices, and the associated node and priority level are stored. Here, "priority level" becomes high as the number is small. The node number corresponds to the node number illustrated in FIG. 2.

For example, in the node (3-2), when a data signal DT of "Video_Channel_1" is not received due to a transmission path failure, the control unit 14a transmits a request signal REQ to the transmission device 1 of the node (3-1) of the route #1. In addition, in the node (3-1), when a data signal DT of "Video_Channel_1" is not received due to a transmission path failure, the control unit 14a transmits a request signal REQ to the transmission device 1 of the node (3-2) of the route #3.

In addition, when a further transmission device 1 that has been detected based on "request target node" is not allowed to cause a data signal DT to branch to the transmission device 1, the control unit 14a further detects a further transmission device 1 the priority level of which is lower than the priority level of the detected further transmission device 1, based on "request target node". That is, when the transmission device 1 of the detected request target node is not allowed to cause a data signal DT (ODU signal Sd) to branch to the transmission device 1 due to a failure or the like, the control unit 14a detects a transmission device 1 the priority level of which is lower than the detected further transmission device 1, and transmits a data signal DT to branch.

For example, in the node (3-2), when a data signal DT is not transmitted from the transmission device 1 of the node (3-1) in which "priority level" is "1", the control unit 14a transmits a request signal REQ to the transmission device 1 of the node (3-3) in which "priority level" is "2". In addition, in the node (3-1), when a data signal DT is not transmitted from the transmission device 1 of the node (3-2) in which "priority level" is "1", the control unit 14a transmits a request signal REQ to the transmission device 1 of the node (3-3) in which "priority level" is "2".

An application example of the embodiment is described below with reference to FIGS. 17 and 18. In the example, it is assumed that the transmission device 1 of the node (3-2) is the request side transmission device 1.

Figure 17:
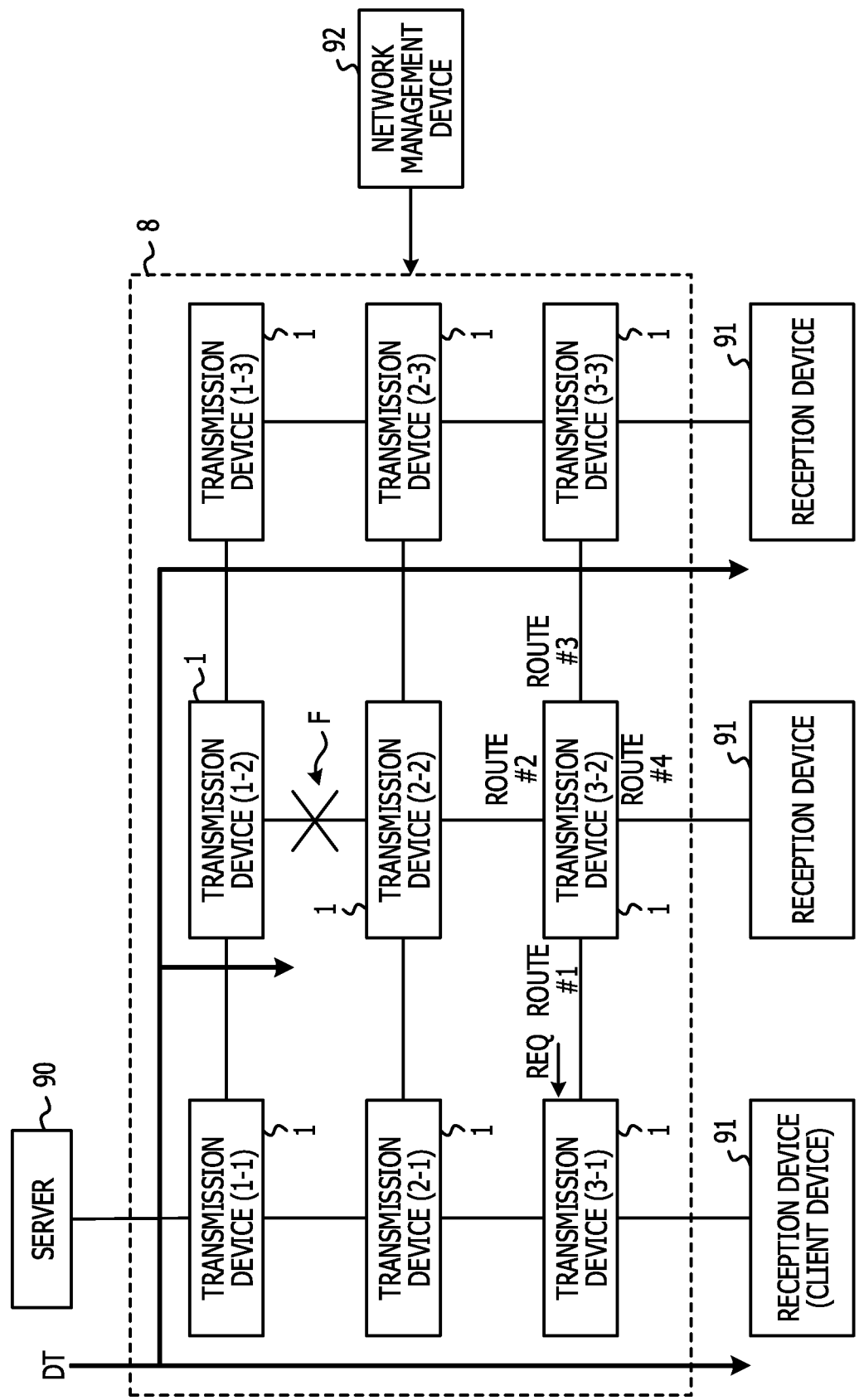
FIG. 17 is a diagram illustrating an application example of the second embodiment.

As illustrated in FIG. 17, when a transmission path failure F occurs in the transmission path between the node (1-2) and the node (2-2), the transmission device 1 of the node (2-2) transmits a notification signal such as an AIS to the request side transmission device 1. When the request side transmission device 1 detects occurrence of a transmission path failure F by the failure detection unit 123, the request side transmission device 1 refers to the management table of the management table storage unit 132 in order to detect a further transmission device (non-request side transmission device) 1 that has received a data signal DT that is not allowed to be received.

In the example, when it is assumed that the node of the request side transmission device 1 is the node (3-2), and signal identification information of a data signal DT that is not allowed to be received due to a transmission path failure F is "Video_Channel_1", "request target node" is the node (3-1), and the route correspond to the route #1 (see FIG. 6). Thus, the control unit 14 of the request side transmission device is transmits a request signal REQ to the transmission device 1 of the node (3-1) of the route #1.

Figure 18:
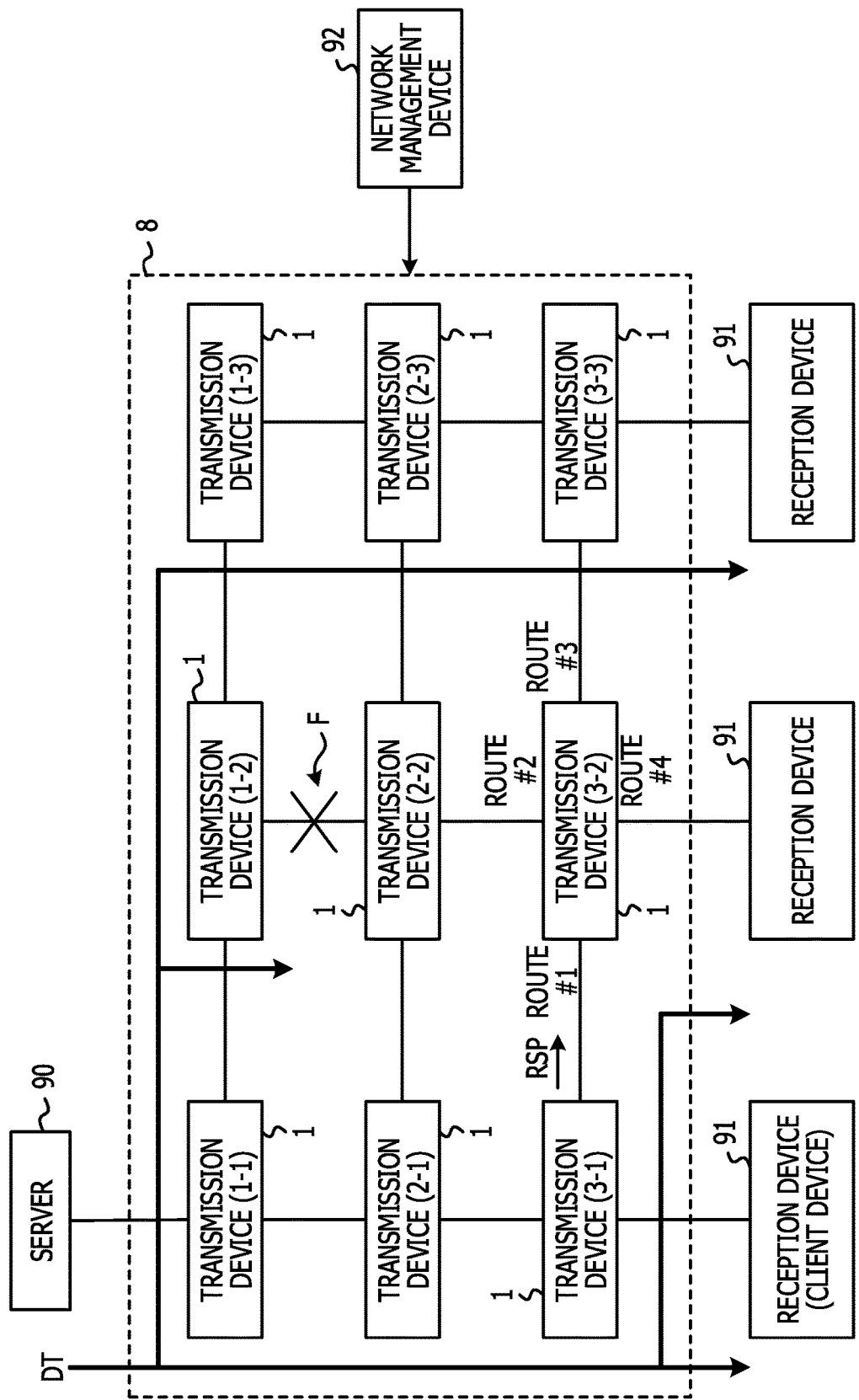
FIG. 18 is a diagram illustrating an application example of the second embodiment.

As illustrated in FIG. 18, the transmission device 1 of the node (3-1) that has received a request signal REQ receives a data signal that is identical to the requested data signal DT, so that the transmission device 1 of the node (3-1) transmits a response signal RSP to the request side transmission device 1. In addition, the transmission device 1 of the node (3-1) transmits the data signal DT to branch to the request side transmission device 1 by the setting of the switch unit 13.

In addition, the request side transmission device 1 transmits the data signal DT that has been transmitted from the transmission device 1 of the node (3-1), to the reception device 91, by the setting of the switch unit 13. As described above, the request side transmission device 1 resets a transmission path of a data signal DT that is not allowed to be received due to the transmission path failure F.

Figure 19:
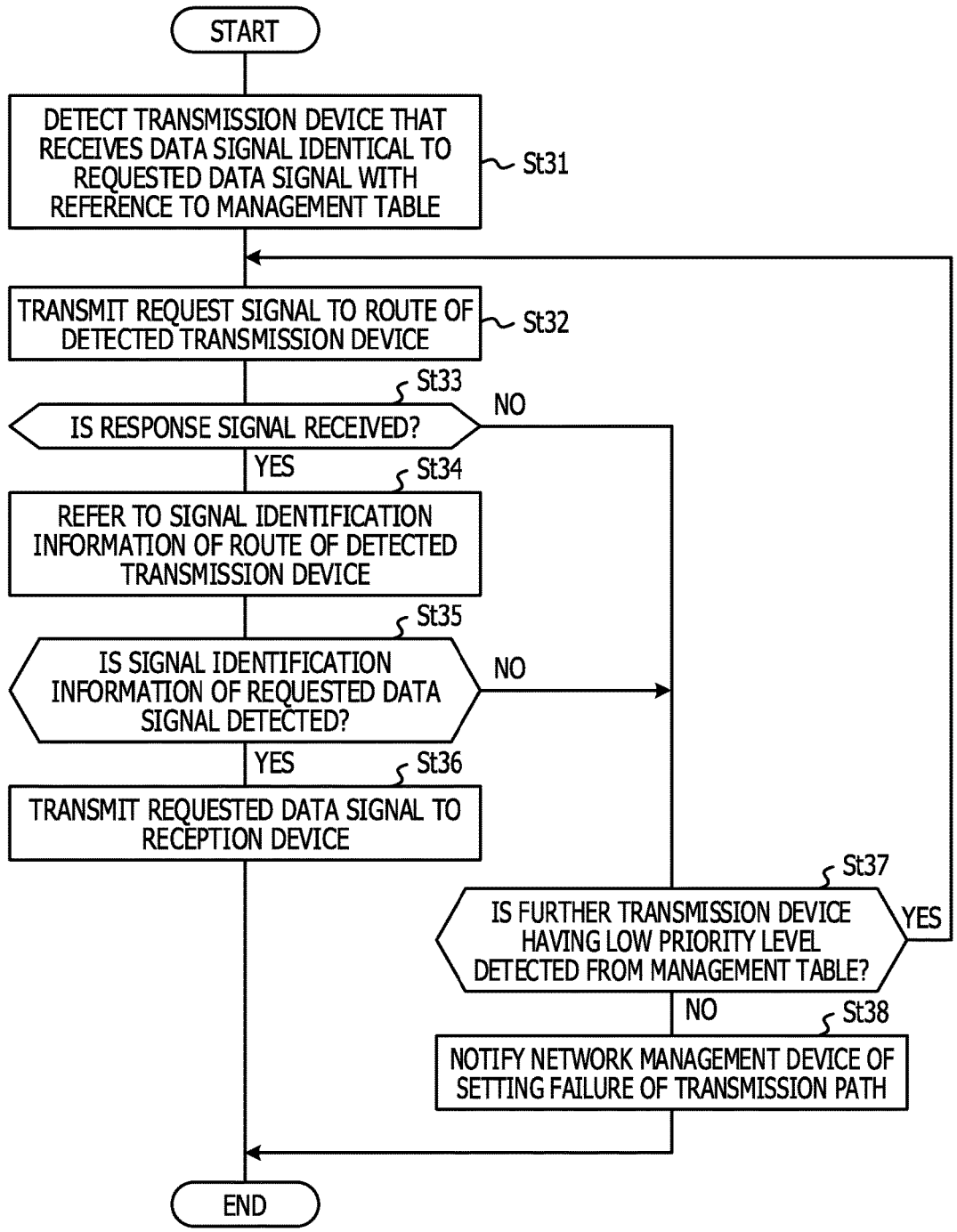
FIG. 19 is a flowchart illustrating an operation of a request side transmission device according to the second embodiment.

FIG. 19 is a flowchart illustrating an operation of the request side transmission device 1 according to the embodiment. The processing illustrated in the flowchart is executed by the control unit 14a when a transmission path failure is detected by the failure detection unit 123.

The control unit 14a detects a further transmission device 1 that has received a data signal that is identical to the requested data signal DT, with reference to the management table of the management table storage unit 132 (Step St31). At that time, the control unit 14a detects the transmission device 1 having the highest "priority level". The control unit 14a may detect a further transmission device 1 rapidly with reference to the management table.

The control unit 14a transmits a request signal REQ to the route of the detected transmission device 1 (Step St2). At that time, the control unit 14a refers to "route" that is stored in the management table.

The control unit 14a determines the presence or absence of reception of a response signal RSP from the transmission device 1 that is the transmission destination of the request signal REQ (Step St33). When a response signal RSP is received within a certain time period after the transmission of the request signal REQ (Yes in Step St33), the control unit 14a refers to the signal identification information of the route of the transmission source of the response signal RSP (Step St34).

The control unit 14a detects whether or not signal identification information of a data signal DT that has been requested to the transmission device 1 is stored in the first identification information storage unit 131 (Step St35). That is, the control unit 14a determines whether or not an ODU signal including the requested data signal DT is transmitted from a further transmission device 1 that has received a request signal REQ, to the transmission device 1, with reference to the first identification information storage unit 131.

When signal identification information of the requested data signal DT is detected within the certain time period (Yes in Step St35), the control unit 14a transmits the data signal DT included in the ODU signal Sd that has been transmitted from the transmission device 1 that is the transmission source of the response signal RSP, to the reception device 91 (Step St36). At that time, the control unit 14a sets the switch unit 13 so that the reception side ODU processing unit 102 of the reception processing unit 10 of the route of the transmission device 1 is cross-connected to the transmission side ODU processing unit 120 on the reception device 91 side. As a result, a transmission path that ranges from the detected further transmission device 1 to the reception device 91 is set, so that the transmission of the data signal DT, which has been interrupted due to the transmission path failure F, is resumed.

In addition, when the response signal RSP is not received (No in Step St33), or when a data signal DT that is identical to the above-described data signal DT is not detected (No in Step St35), the control unit 14a detects a further transmission device 1 having a lower priority level (priority level "2") from the management table (Step St37).

When a further transmission device 1 is detected (Yes in Step St37), the control unit 14a executes the processing from Step St32 again. Thus, even when the detected further transmission device 1 is not allowed to cause a data signal DT to branch to the transmission device 1 due to a transmission path failure or the like, the request side transmission device 1 may detect a further transmission device 1, and transmits a data signal DT to branch to the transmission device 1.

On the other hand, when a further transmission device 1 is not detected (No in Step St37), the control unit 14a notifies the network management system 92 of setting failure of a transmission path (Step St38). As described above, the request side transmission device 1 executes the setting processing of a transmission path.

Figure 20:
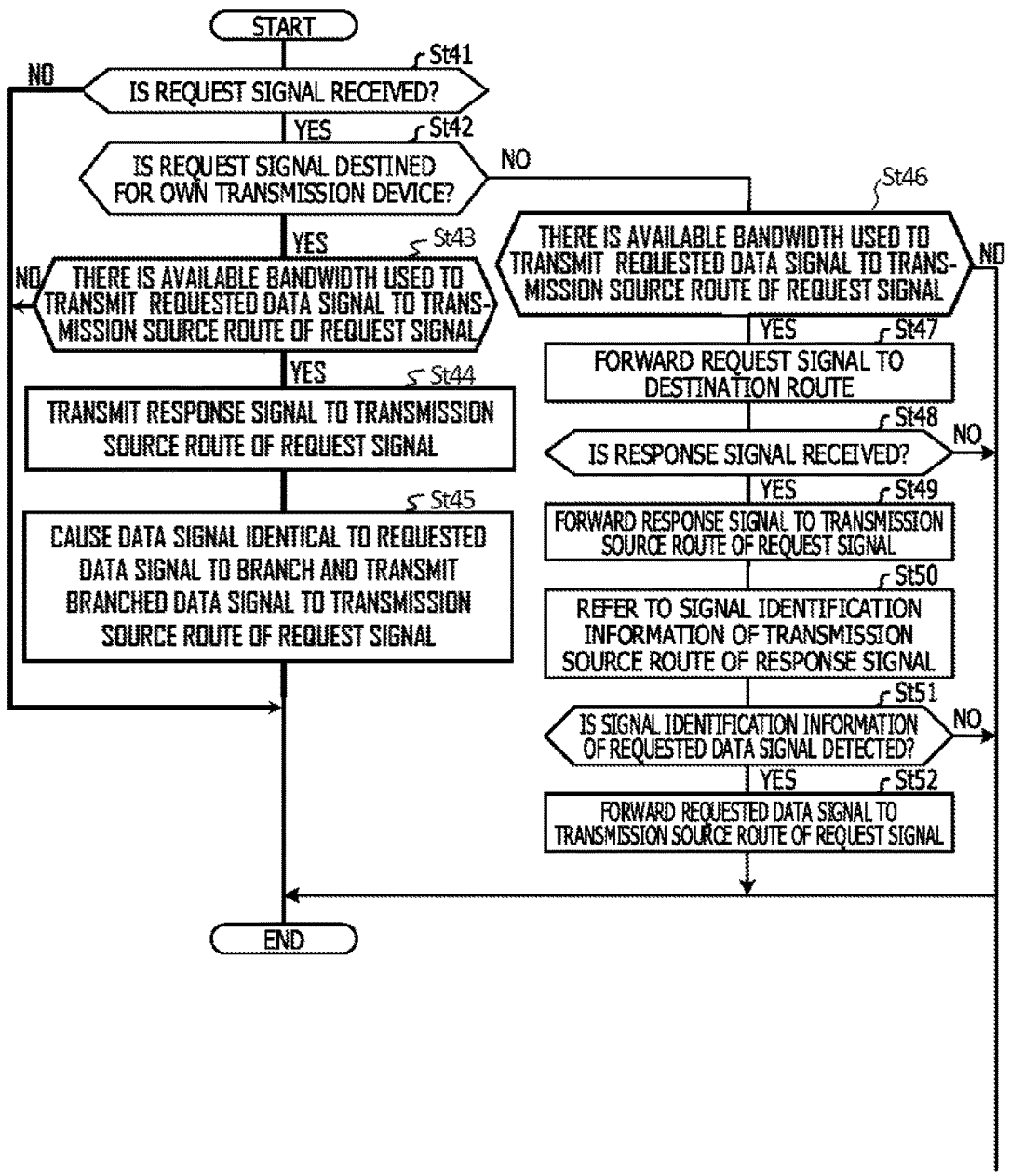
FIG. 20 is a flowchart illustrating an operation of a non-request side transmission device according to the second embodiment.

FIG. 20 is a flowchart illustrating an operation of the non-request side transmission device 1 according to the embodiment. When the control unit 14a receives a request signal REQ (Yes in Step St41), the control unit 14a determines whether or not the request signal REQ is destined for the transmission device 1 (Step St42). Here, destination information that indicates the destination of the request signal REQ may be included, for example, in the ODU header of the OTU frame 60 (GCC 1 and 2, or RES).

When the request signal REQ is destined for the transmission device 1 (Yes in Step St42), the control unit 14a determines the presence or absence of an available bandwidth that is used to transmit a requested data signal DT to a transmission source route of the request signal REQ (Step St43). That is, the control unit 14a determines whether or not a bandwidth that is indicated by a bandwidth code included in the request signal REQ is obtained for the corresponding route, with reference to the bandwidth information storage unit 130.

When there is no available bandwidth (No in Step St43), in the control unit 14a, the processing ends. On the other hand, when there is a available bandwidth (Yes in Step St43), the control unit 14a transmits a response signal RSP to the route of the transmission source of the request signal REQ (Step St44).

The control unit 14a controls a data signal that is identical to the requested data signal DT (ODU signal Sd) to branch, and transmits the branched data signal to the route of the transmission source of the request signal REQ (Step St45). At that time, the control unit 14a sets the switch unit 13 so that the requested data signal DT (ODU signal Sd) branches to the original route and a route that is destined for the request side transmission device 1 (see symbols d2 and d3 in FIG. 2).

On the other hand, when the received request signal REQ is not destined for the transmission device 1 (No in Step St42), the non-request side transmission device 1 operates as a forward device that forwards control information and a data signal DT (ODU signal Sd).

First, the control unit 14a determines the presence or absence of a available bandwidth that is used to transmit a requested data signal DT to a transmission source route of a request signal REQ, with reference to the bandwidth information storage unit 130 (Step St46). The processing is similar to the above-described processing of Step St43, and may be integrated with the processing of Step St43, and for example, the integrated pieces of processing may be executed after Step St41.

When there is no available bandwidth (No in Step St46), in the control unit 14a, the processing ends. On the other hand, when there is a available bandwidth (Yes in Step St46), the control unit 14a forwards the request signal REQ to a route that is a destination indicated by the destination information (Step St47).

The control unit 14a determines the presence or absence of reception of a response signal RSP (Step St48). When the control unit 14a does not receive a response signal RSP within a certain time period (No in Step St48), the processing ends. On the other hand, when the control unit 14a receives a response signal RSP within a certain time period (Yes in Step St48), the control unit 14a forwards the received response signal RSP to the route of the transmission source of the request signal REQ (Step St49).

The control unit 14a refers to signal identification information of the route of the transmission source of the response signal RSP (Step St50). The control unit 14a detects whether or not signal identification information of the requested data signal DT is stored in the first identification information storage unit 131 (Step St51). That is, the control unit 14a detects whether or not the transmission device 1 has received a data signal DT that is indicated by the signal identification information included in the request signal REQ, with reference to the first identification information storage unit 131.

When signal identification information of the requested data signal DT is not detected (No in Step St51), in the control unit 14a, the processing ends. On the other hand, when signal identification information of the requested data signal DT is detected (Yes in Step St51), the control unit 14a forwards the requested data signal DT (ODU signal Sd) to the route of the transmission source of the request signal REQ (Step St52). At that time, the control unit 14a sets the switch unit 13 so that the requested data signal DT (ODU signal Sd) is transmitted to the route of the transmission source of the request signal REQ. As described above, the non-request side transmission device 1 executes the setting processing of a transmission path.

As described above, in the embodiment, the request side transmission device 1 includes the management table storage unit 132 that stores a node number (device identification information) that is used to identify a further transmission device 1 that has received a data signal DT that has been requested to the transmission device 1. The control unit 14a detects a further transmission device 1 that has received a data signal DT that has been requested to the transmission device 1, based on the node number.

Thus, in the embodiment, a further transmission device 1 that has received a data signal DT that has been requested to the transmission device 1 may be detected further rapidly based on the node number of the management table storage unit 132, which has been set beforehand.

In addition, in the embodiment, the control unit 14a transmits a request signal REQ merely to the detected transmission device 1, so that communication after reception of a response signal RSP is not performed differently from the first embodiment. Therefore, in the embodiment, the setting processing of a transmission path may be simplified.

In the above-described embodiment, the request side transmission device 1 detects a further transmission device 1 that has received a data signal DT that is not allowed to be received due to a transmission path failure F (requested data signal DT) when a failure occurs, but the embodiment is not limited to such as example.

Figure 21:
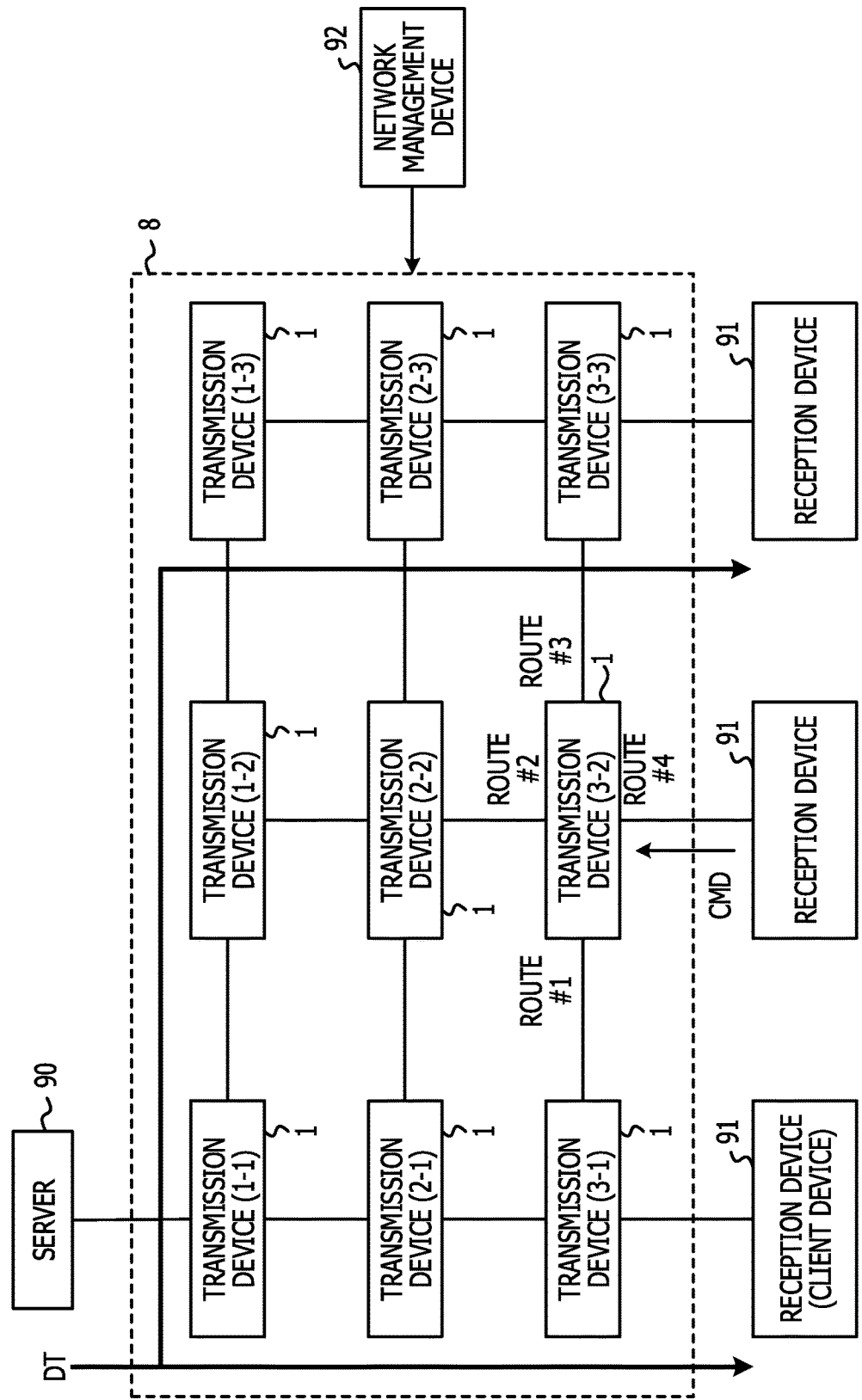
FIG. 21 is a diagram illustrating a transmission instruction signal that is transmitted from a reception device.

As illustrated in FIG. 21, the request side transmission device 1 may detect a further transmission device 1 that has received a data signal DT that has been requested to the transmission device 1 when a transmission instruction signal CMD that is used to instruct transmission of a data signal DT is received from the reception device 91. In such a case, for example, it is assumed that a new reception device 91 is added to the transmission system.

Figure 22:
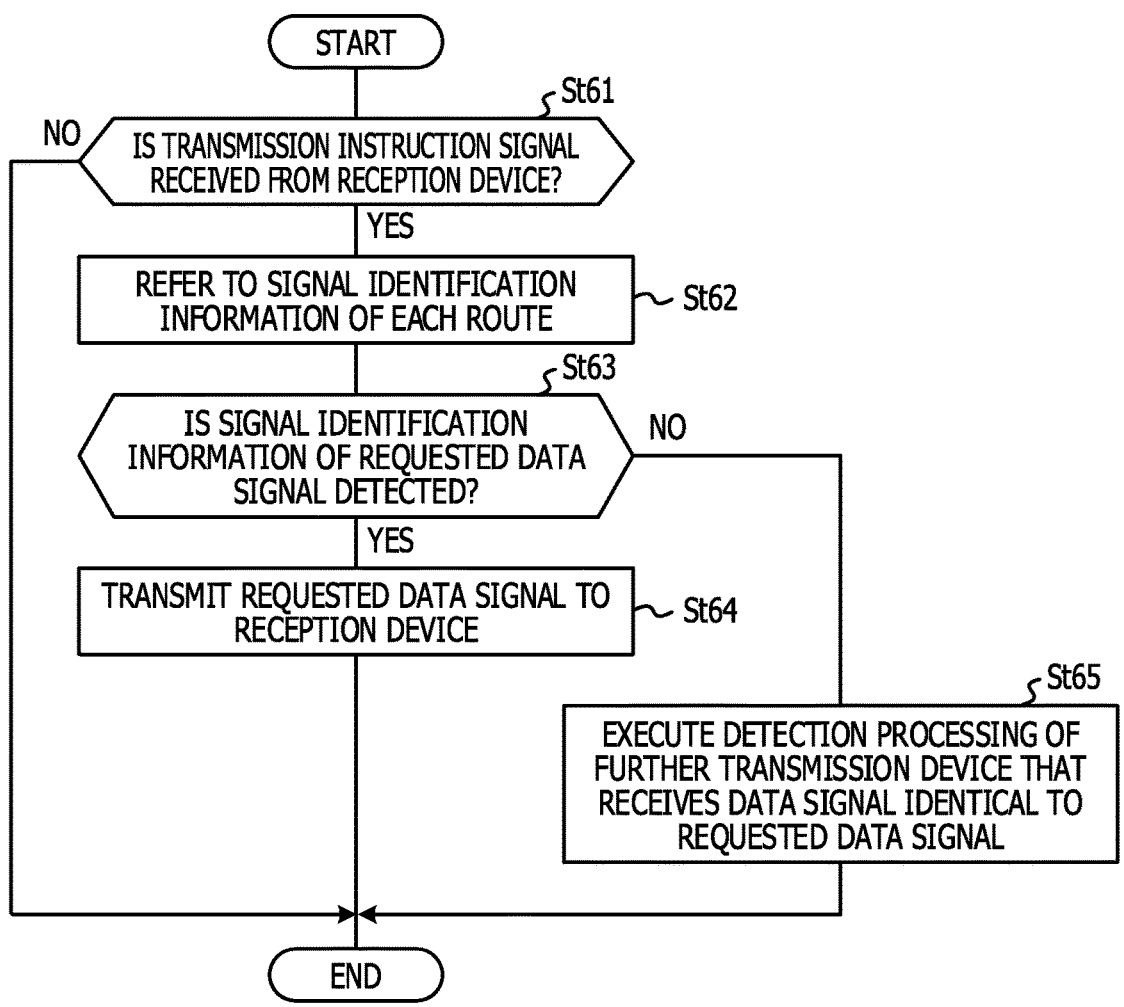
FIG. 22 is a flowchart illustrating detection processing of a data signal of the request side transmission device.

In this case, prior to detection of a further transmission device 1 that has received a data signal DT, the request side transmission device 1 determines whether or not the transmission device 1 has received the data signal. FIG. 22 is a flowchart illustrating detection processing of a data signal DT of the request side transmission device in such a case.

In the control units 14 and 14a, when a transmission instruction signal CMD is received from the reception device 91 (Yes in Step St61), the control unit refers to signal identification information of each of the routes that are stored in the first identification information storage unit (Step St62). When signal identification information of a requested data signal DT is detected by the transmission instruction signal CMD (Yes in Step St63), the control unit transmits the requested data signal DT to the reception device 91 (Step St64). That is, the control unit sets the switch unit 13 so that the data signal DT is transmitted to the reception device 91 when the transmission device 1 receives the requested data signal DT.

On the other hand, when signal identification information of the requested data signal DT is not detected (No in Step St63), the control unit executes the detection processing of a further transmission device 1 that has received a data signal that is identical to the requested data signal DT (Step St65). That is, when the transmission device 1 does not receive the requested data signal DT, the control unit executes the above-described processing with reference to FIG. 13 or 19. As described above, the request side transmission device 1 executes the detection processing of a data signal DT.

As described above, when a data signal DT is not allowed to be received due to occurrence of a failure, or when a transmission instruction of a data signal DT is received from the reception device 91, the transmission device 1 according to the embodiment sets a transmission path of the data signal DT autonomously.

As described above, as the request side transmission device 1, the transmission devices 1 of the nodes (3-1) to (3-3) that are adjacent to the reception device 91 are used as examples, but the embodiment is not limited to such examples, and a transmission path may be set by the similar configuration even when the transmission device 1 of a further node is used as the request side transmission device 1. In this case, in the control units 14 and 14a of the request side transmission device 1, the switch unit 13 is set so that a data signal DT that has been transmitted from the non-request side transmission device 1 is output to the transmission side ODU processing unit 110 of the corresponding route, instead of the transmission side ODU processing unit 120.

As described above, the transmission device 1 according to the embodiment is connected to the mesh network 8 and includes the control unit 14 or 14a. In the control units 14 and 14a, a further transmission device 1 that has received a data signal DT that is identical to a data signal DT that has been requested to the transmission device 1 is detected, and the data signal DT is caused to branch to the transmission device 1 from the detected further transmission device 1.

Thus, the transmission device 1 according to the embodiments saves the effort of setting a transmission path that ranges from the server 90 that is a transmission source of the data signal DT to the reception device 91, and may transmit the data signal DT from the detected further transmission device 1 to the transmission device 1. Therefore, in the embodiment, the transmission path of broadcast distribution may be rapidly set.

In addition, the transmission system according to the embodiment includes the plurality of transmission devices 1 connected to the mesh network 8. From among the plurality of transmission devices 1, the request side transmission device 1 detects a further transmission device 1 (non-request side transmission device 1) that has received a data signal DT that is identical to a data signal DT that has been requested to the transmission device 1, and transmits the data signal DT to branch from the detected further transmission device 1 to the transmission device 1. When the non-request side transmission device 1 is detected by the request side transmission device 1, the non-request side transmission device 1 transmits the received data signal DT to branch to the request side transmission device 1.

The transmission system according to the embodiment includes the transmission device 1 according to the embodiment, so that an operation effect that is similar to the above-described content is obtained.

The transmission method according to the embodiment includes detecting a further transmission device 1 that has received a data signal DT that has been requested to one of the plurality of transmission devices 1 connected to the mesh network 8, and causing the data signal DT to branch from the detected further transmission device 1 to the one of the plurality of transmission devices.

Thus, the transmission method according to the embodiment obtains an operation effect that is similar to the above-described content.

The embodiments discussed herein are described above with reference to the examples, but it is obvious that various modifications ca be made by those skilled in the art based on the basic technical idea and teachings and of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device that is coupled to a mesh network comprising:
a memory; and
a processor coupled to the memory, configured to:
transmit a request signal that includes signal identification information that is used to identify a second data signal requested to the transmission device, to another transmission device in the mesh network;
detect the another transmission device in the mesh network, which receives a first data signal that is the same as the second data signal requested to the transmission device by receiving a response signal for the request signal, from the another transmission device; and
branch the first data signal to the transmission device from the detected another transmission device.

2. The transmission device according to claim 1, wherein the processor is further configured to cause the first data signal of the another transmission device that transmits the response signal that is received at an earliest timing, from among response signals that are received from a plurality of other transmission devices, to branch to the transmission device.

3. The transmission device according to claim 1, wherein the memory is configured to store device identification information that is used to identify the another transmission device that receives the first data signal that is the same as the second data signal requested to the transmission device, and the processor is further configured to detect the another transmission device that receives the data signal that is identical to the data signal requested to the transmission device, based on the device identification information.

4. The transmission device according to claim 3, wherein the memory is further configured to store the device identification information in which transmission devices are associated with respective priority levels, and the processor is configured to detect a third transmission device, the priority level of which is low as compared with the priority level of the detected another transmission device, based on the device identification information when the another transmission device that is detected based on the device identification information does not cause the data signal to branch to the transmission device.

5. A transmission system comprising:
a plurality of transmission devices that is coupled to a mesh network,
wherein at least one of the plurality of transmission devices:
transmits a request signal that includes signal identification information that is used to identify a second data signal requested to the transmission device, to another transmission device in the mesh network;
detects the another transmission device in the mesh network, which receives a first data signal that is the same as the second data signal requested to the transmission system by receiving a response signal for the request signal, from the another transmission device; and
transmits the first data signal to branch to the transmission device from the detected another transmission device,
wherein the another transmission device transmits the received first data signal to branch to the at least one of the plurality of transmission devices when the another transmission device is detected by the at least one of the plurality of transmission devices.

6. The transmission system according to claim 5, wherein the another transmission device searches for signal identification information that corresponds to the signal identification information included in the request signal, from among pieces of signal identification information that are used to identify the second data signal received by the transmission device, and transmits the response signal to the at least one of the plurality of transmission devices when signal identification information that corresponds to the signal identification information included in the request signal, is found.

7. The transmission system according to claim 6, wherein when signal identification information that corresponds to the signal identification information included in the request signal is not found, the another transmission device forwards the request signal to one or more another transmission devices.

8. The transmission system according to claim 6, wherein the at least one of the plurality of transmission devices transmits the first data signal of the another transmission device that transmits a response signal that is received at an earliest timing, from among the response signals that are received from the plurality of another transmission devices to branch to the transmission device.

9. The transmission system according to claim 5, wherein the at least one of the plurality of transmission devices stores device identification information that is used to identify the another transmission device that receives the first data signal that is the same as the second data signal requested to the transmission device, and detects the another transmission device that receives the first data signal that is the same as the second data signal requested to the transmission device, based on the device identification information.

10. The transmission system according to claim 9, wherein
the at least one of the plurality of transmission devices stores the device identification information in which transmission devices are associated with respective priority levels, and further detects a transmission device the priority level of which is low as compared with the priority level of the detected another transmission device, based on the device identification information when the another transmission device that is detected based on the device identification information, does not cause the first data signal to branch to the transmission device.

11. A transmission method comprising:
transmitting a request signal that includes signal identification information that is used to identify a second data signal requested to the one of the plurality of transmission devices to another transmission device in a mesh network;
detecting the another transmission device in the mesh network, which receives a first data signal that is the same as the second data signal requested to one of a plurality of transmission devices that is coupled to the mesh network by receiving a response signal for the request signal, from the another transmission device; and
causing the first data signal to branch to the one of the plurality of transmission devices from the detected another transmission device.

12. The transmission method according to claim 11, wherein the first data signal of the another transmission device that transmits a response signal that is received at an earliest timing, from among response signals that are received from a plurality of another transmission devices is caused to branch to the one of the plurality of transmission devices.

13. The transmission method according to claim 11, wherein
 based on device identification information that is used to identify the another transmission device that receives the first data signal that is the same as the second data signal requested to the one of the plurality of transmission devices, the another transmission device that receives the first data signal that is the same as the second data signal requested to the one of the plurality of transmission devices, is detected.

14. The transmission method according to claim 13, wherein the device identification information is information in which the transmission devices are associated with respective priority levels, and a transmission device the priority level of which is low as compared with the priority level of the detected another transmission device, is further detected based on the device identification information when the another transmission device that is detected based on the device identification information does not cause the data signal to branch to the one of the plurality of transmission devices.

\* \* \* \* \*